US010321330B2

(12) United States Patent
Zerick et al.

(10) Patent No.: US 10,321,330 B2
(45) Date of Patent: *Jun. 11, 2019

(54) SUPPLEMENTING NETWORK COVERAGE WITH A FLEET OF AUTONOMOUS DRONES

(71) Applicants: AT&T Intellectual Property I, L.P., Atlanta, GA (US); AT&T Mobility II, LLC, Atlanta, GA (US)

(72) Inventors: Juliette Zerick, Alpharetta, GA (US); Eugene H. Rascle, Jr., St. Helena Island, SC (US); Jeremy Fix, Acworth, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,090

(22) Filed: Mar. 2, 2018

(65) Prior Publication Data

US 2018/0199210 A1    Jul. 12, 2018

Related U.S. Application Data

(63) Continuation of application No. 15/063,424, filed on Mar. 7, 2016, now Pat. No. 9,918,234.

(51) Int. Cl.
*H04W 16/26* (2009.01)
*H04W 64/00* (2009.01)
(Continued)

(52) U.S. Cl.
CPC ........ *H04W 16/26* (2013.01); *H04B 7/18506* (2013.01); *H04W 24/02* (2013.01); *H04W 24/04* (2013.01); *H04W 64/003* (2013.01)

(58) Field of Classification Search
CPC ... H04W 24/04; H04W 16/26; H04W 64/003; H04W 24/02; H04B 7/18506
See application file for complete search history.

(56) References Cited

U.S. PATENT DOCUMENTS

| 9,022,324 B1 | 5/2015 | Abhyanker |
| 2015/0236778 A1 | 8/2015 | Jalali |

(Continued)

FOREIGN PATENT DOCUMENTS

| WO | WO-2015139733 A1 * | 9/2015 | ............ H04W 24/02 |
| WO | WO 2015139733 A1 | 9/2015 | |

OTHER PUBLICATIONS

Sun et al., "Holes Detection in Wireless Sensor Network and Redeploy Route Planning Based on Unmanned Aerial Vehicle", Journal of Information and Computational Science, vol. 9, No. 13, pp. 3665-3672 (2012).

(Continued)

*Primary Examiner* — Wayne H Cai
(74) *Attorney, Agent, or Firm* — Haynes and Boone, LLP

(57) ABSTRACT

Methods, apparatus, systems and articles of manufacture (e.g., physical storage media) to supplement network coverage with a fleet of autonomous drones are disclosed. Example methods disclosed herein include configuring a first drone with information specifying a size and a target location associated with the coverage area. Disclosed example methods also include, when the first drone reaches the target location, monitoring for communication signals to determine whether a first coverage zone provided by the first drone and a second coverage zone provided by a second drone in a fleet of drones overlap. Disclosed example methods further include autonomously adjusting a position of the first drone to maintain overlapping of the first coverage zone provided by the first drone with the coverage (Continued)

area, but to reduce an amount of overlap of the first coverage zone with the second coverage zone.

20 Claims, 13 Drawing Sheets

(51) Int. Cl.
*H04W 24/04* (2009.01)
*H04B 7/185* (2006.01)
*H04W 24/02* (2009.01)

(56) References Cited

U.S. PATENT DOCUMENTS

| | | |
|---|---|---|
| 2015/0236779 A1 | 8/2015 | Jalali |
| 2015/0236780 A1 | 8/2015 | Jalali |
| 2015/0280812 A1 | 10/2015 | Jalali |
| 2015/0304869 A1 | 10/2015 | Johnson et al. |
| 2015/0312774 A1 | 10/2015 | Lau |
| 2015/0327136 A1 | 11/2015 | Kim et al. |
| 2015/0334768 A1* | 11/2015 | Ranasinghe .......... H04W 24/10 370/328 |
| 2015/0373558 A1 | 12/2015 | Weisbrod et al. |
| 2016/0013858 A1 | 1/2016 | Jalali et al. |
| 2017/0013476 A1* | 1/2017 | Suthar .................. H04W 24/02 |
| 2017/0019799 A1* | 1/2017 | Djordjevic ............ H04W 24/02 |

OTHER PUBLICATIONS

Orfanus et al., "Self-Organizing Relay Network Supporting Remotely Deployed Sensor Nodes in Military Operations", Ultra Modern Telecommunications and Control Systems and Workshops (ICUMT), $6^{th}$ International Congress on IEEE, 8 pgs. (2014).

Gupta et al., "Survey of Important Issues in UAV Communication Networks", IEEE Communications Surveys and Tutorials, vol. PP, No. 99, 32 pgs. (Nov. 2015).

* cited by examiner

SUPPLEMENTING NETWORK COVERAGE WITH A FLEET OF AUTONOMOUS DRONES

PRIORITY DATA

The present application is a continuation application of U.S. patent application Ser. No. 15/063,424, filed Mar. 7, 2016, issued as U.S. Pat. No. 9,918,234 on Mar. 13, 2018, the disclosure of which is incorporated herein by reference in its entirety.

FIELD OF THE DISCLOSURE

This disclosure relates generally to drones, such as unmanned aerial vehicles, and, more particularly, to supplementing network coverage with one or more fleets of autonomous drones.

BACKGROUND

Drones, such as unmanned aerial vehicles (UAVs), are mobile platforms capable of acquiring (e.g., sensing) information, delivering goods, manipulating objects, etc., in many operating scenarios. For example, drones can travel quickly, and without the physical limitations of ground based transport, to locations that are remote, dangerous, unable to be reached by human personnel, etc., or any combination thereof. Upon reaching such locations, drones can provide many benefits, such as acquiring sensor data (e.g., audio, image, video and/or other sensor data) at a target location, delivering goods (e.g., medical supplies, food supplies, engineering materials, etc.) to the target location, manipulating objects (e.g., such as retrieving objects, operating equipment, etc.) at the target location, etc. More recently, drones have been proposed as possible solutions for extending wireless network coverage to locations that have no existing network coverage, and/or that are experiencing weak or loss-of-signal conditions due to unexpected or planned network outages.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1A:
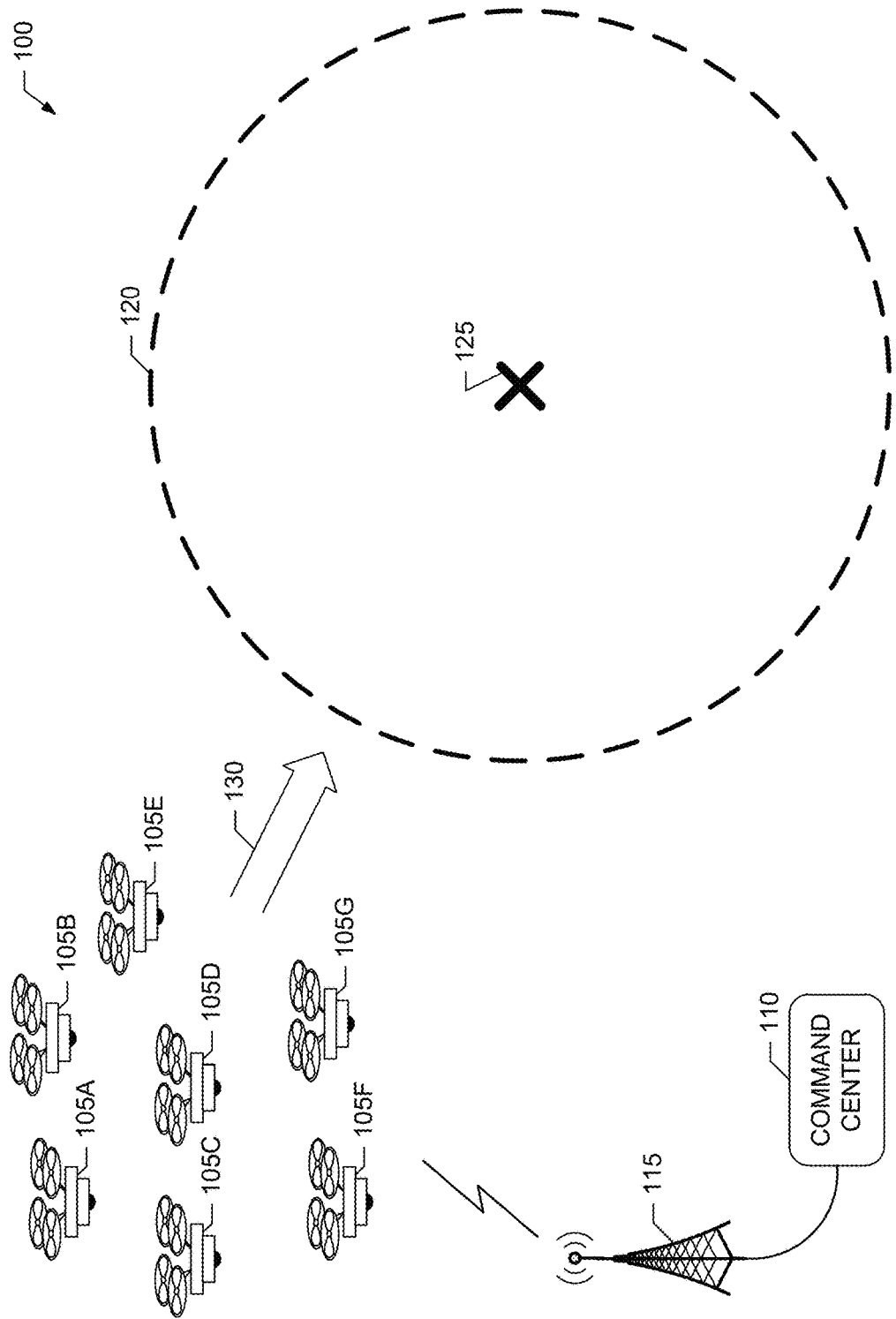
FIGS. 1A-C illustrate an example environment of use in which an example fleet of autonomous drones can be deployed by an example command center to supplement network coverage in accordance with the teachings of this disclosure.

Methods, apparatus, systems and articles of manufacture (e.g., physical storage media) to supplement network coverage with a fleet of autonomous drones are disclosed herein. Example methods disclosed herein to supplement network coverage in a coverage area include initializing or otherwise configuring a first drone in a fleet of drones with information specifying a size of the coverage area and an initial target location associated with the coverage area. Disclosed example methods also include, when the first drone reaches the initial target location (e.g., after being deployed by a command center), monitoring for communication signals with a transceiver of the first drone to determine whether a first coverage zone provided by the first drone and a second coverage zone provided by a second drone in the fleet of drones overlap. For example, the first drone may include a portable base station to implement a first cell of a mobile cellular network, and the first cell may correspond to the first coverage zone provided by the first drone. Disclosed example methods further include autonomously adjusting a position of the first drone to maintain overlapping of the first coverage zone provided by the first drone with the coverage area, but to reduce an amount of overlap of the first coverage zone of the first drone with the second coverage zone of the second drone.

In some such disclosed example methods, the monitoring performed by the first drone includes measuring a first signal strength of a first communication signal received from the second drone. Some such disclosed example methods also include determining the first coverage zone provided by the first drone and the second coverage zone provided by a second drone overlap when the first signal strength of the first communication signal meets (e.g., is greater than or equal to) a zone overlap threshold value. For example, the zone overlap threshold value may be specified in initialization information (e.g., provided by the command center).

Some such disclosed example methods further include initializing or otherwise configuring the first drone with information specifying a size of the first coverage zone provided by the first drone. In some such disclosed example methods, the autonomously adjusting of the position of the first drone includes measuring the position of the first drone after adjusting the first drone to move by a first distance in a first direction to determine a measured position of the first drone. In some such disclosed example methods, the autonomously adjusting of the position of the first drone also includes measuring a second signal strength of the first communication signal received from the second drone after adjusting the first drone to move by the first distance in the first direction. In some such disclosed example methods, the autonomously adjusting of the position of the first drone further includes adjusting the position of the first drone by a second distance in a second direction based on the second signal strength, the measured position of the first drone, the size of the first coverage zone, and the information specifying the size of the coverage area and the initial target location associated with the coverage area.

For example, some such disclosed example methods include selecting, at the first drone, the second direction to correspond to the first direction in response to determining a first condition is satisfied. In some such examples, the first condition is satisfied when (1) the second signal strength is both less than the first signal strength and meets the zone overlap threshold value, and (2) at least a portion of the first coverage zone is determined to overlap the coverage area based on the measured position of the first drone, the size of the first coverage zone and the initial target location associated with the coverage area. Some such disclosed example methods also include selecting the second direction to be different from the first direction in response to determining the first condition is not satisfied.

However, instead or, or in addition to, the second direction being selected at the first drone, some disclosed example methods include reporting the first signal strength, the second signal strength and the measured position to a controller (e.g., a command center) remote from the first drone. Some such disclosed example methods also include receiving, at the first drone from the controller, commands specifying the second distance and the second direction.

These and other example methods, apparatus, systems and articles of manufacture (e.g., physical storage media) to supplement network coverage with a fleet of autonomous drones are disclosed in greater detail below.

Drones, such as UAVs, have the capability to provide many benefits in many different possible scenarios. As noted above, drones have also been proposed as possible solutions for extending wireless network coverage to locations having no existing coverage and/or experiencing weak or loss-of-signal conditions. For example, despite years of infrastructure upgrades, there are still many geographic regions of the country without cellular network coverage. Such geographic regions/areas are also referred to herein as network coverage holes. In the case of a disaster, network infrastructure may be damaged or destroyed, which may reduce or eliminate network coverage in the affected geographic area, thereby also resulting in network coverage holes. Repairing existing infrastructure at such geographic areas and/or providing new infrastructure to such geographic areas may take considerable time.

Drone-based techniques disclosed herein for supplementing network coverage provide technical solutions to such network coverage problems by leveraging a fleet of drones equipped to function as portable base stations to rapidly provide temporary or long-term coverage to geographic locations experiencing network coverage holes. In some disclosed example drone-based network coverage solutions, the drones can land to patch coverage holes in the network. In some disclosed example drone-based network coverage solutions, such as solutions for locations having irregular terrain and/or hazardous conditions (such as those associated with a disaster), the drones can fly overhead, blanketing the affected area with potentially lifesaving network coverage.

Figure 1B:
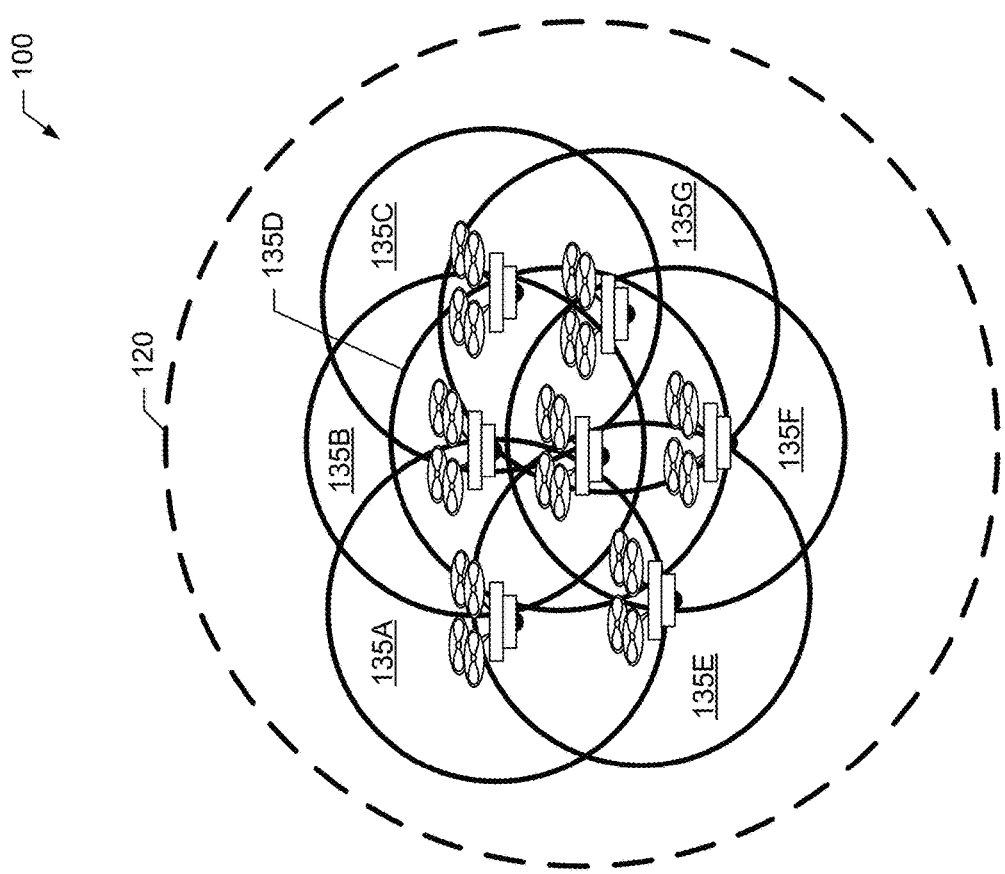
Figure 1B:
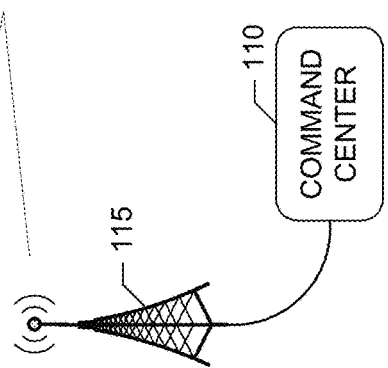
Figure 1C:
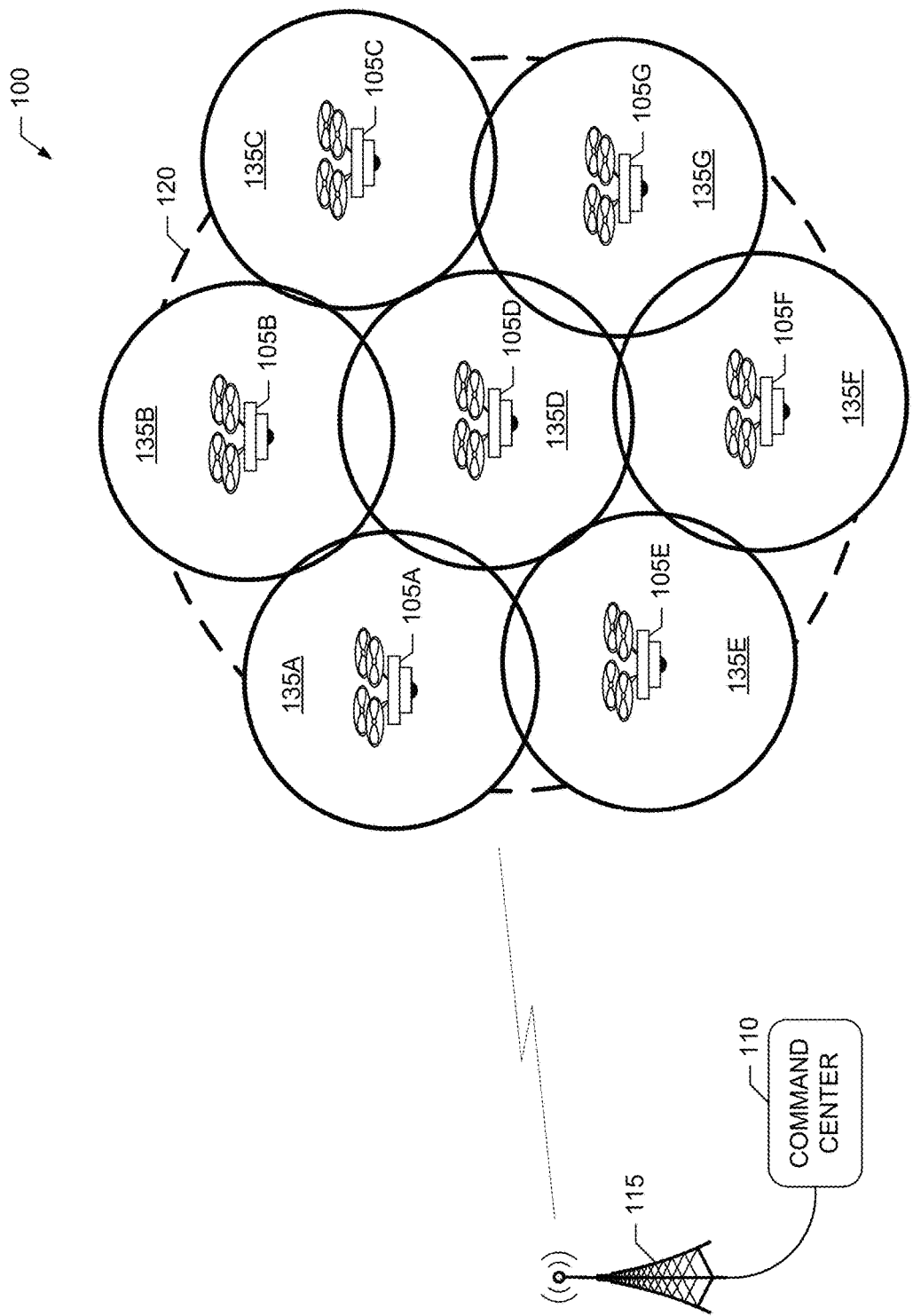

Turning to the figures, a block diagram of an example environment of use 100 in which an example fleet of drones 105A-G are deployed to supplement network coverage in accordance with the teachings of this disclosure is illustrated in FIGS. 1A-C. A fleet of drones, such as the fleet of drones 105A-G, includes two or more drones. Also, the drones included in a fleet of drones may all be the same type of drone, or may be different types of drones. For example, respective ones of the example drones 105A-G may be implemented by, for example, any type of drone, such as an unmanned aerial vehicle (UAV), etc., and/or other vehicular device, such as an unmanned vehicular device, a robotic device, etc., that is a ground vehicle, a water craft, etc. In the illustrated example of FIGS. 1A-C, the drones 105A-G are depicted as UAVs and include respective flight control units and payload units.

For example, the flight control unit of a given one of the example drones 105A-G includes any appropriate avionics, control actuators, and/or other equipment to fly the drone. In the illustrated example environment of use 100 of FIGS. 1A-C, the payload units of the example drones 105A-G include example portable base stations. For example, a portable base station included in the payload unit of given one of the drones 105A-G may be implemented by a portable enhanced node-B (also referred to as a portable eNode B or portable eNB) capable of providing cellular coverage (e.g., by implementing one or more cells) in a long term evolution (LTE) mobile communication network. Additionally or alternatively, the payload unit of one of the drones 105A-G may include one or more portable base stations capable of providing cellular coverage (e.g., by implementing one or more cells) in any second generation (2G), third generation (3G) and/or fourth generation (4G) mobile communication network, one or more portable base stations implementing one or more WiFi access points, etc., or any combination thereof.

In the illustrated example environment of use 100 of FIGS. 1A-C, the example drones 105A-G include one or more transceivers to enable the drones to be in communication with an example command center 110. As used herein, the phrase "in communication," including variances thereof, encompasses direct communication and/or indirect communication through one or more intermediary components and does not require direct physical (e.g., wired and/or wireless) communication and/or constant communication, but rather additionally includes selective communication at periodic or aperiodic intervals, as well as one-time events.

For example, the drones 105A-G in the example environment of use 100 of FIGS. 1A-C include respective transceiver(s) to permit communication with the command center via an example communication network 115. In the illustrated example environment of use 100, the communication network 115 is implemented by an example mobile cellular network, such as an LTE network or other 3G or 4G wireless network. However, in some examples, the communication network 115 may be additionally or alternatively be implemented by one or more other communication networks, such as, but not limited to, a satellite communication network, a microwave radio network, etc.

In the example environment of use 100 of FIGS. 1A-C, the example fleet of drones 105A-G and the example command center 110 collectively implement disclosed example techniques to deploy the fleet of drones 105A-G to a geographic area experiencing a network coverage hole, such as the illustrated example coverage area 120, which is also referred to as the example coverage hole 120. Turning to FIG. 1A, in some examples, the command center 110 receives monitored network status data, such as monitored signal strength/quality data, monitored network capacity data, etc., from monitoring locations (e.g., such as cell sites) in a communication network, which may be the same as, or different from, the communication network 115. For example, the command center 110 can use the communication network 115 (e.g., a satellite network, a first mobility network, etc.) to communicate with the fleet of drones 105A-G for purposes of supplementing network coverage for a different communication network (e.g., a second mobility network). However, in some examples, the communication network 115 used by the command center 110 to communicate with the fleet of drones 105A-G may be the same communication network (e.g., the same mobility network) for which the fleet of drones 105A-G can supplement network coverage.

In some examples, the command center 110 receives the status data for the communication network being monitored in real-time, at given reporting intervals, etc. In some examples, the command center 110 compares the monitored network status data with prior (e.g., reference) network coverage map(s) to detect network coverage holes, such as the example network coverage hole 120. For example, a network coverage hole can correspond to cell site that has a monitored signal strength/quality that is lower than expected per the network coverage map, and/or that has a monitored available capacity that is lower than expected per the network coverage map, etc.

In response to detecting the example network coverage hole 120, the command center 110 deploys the fleet of drones 105A-G to a target geographic location associated with the network coverage hole 120. In some examples, the command center 110 initializes (e.g., via one or more commands sent via the network 115) the drones 105A-G with an example initial target location 125 associated with the network coverage hole 120, as well as a size of the network coverage hole 120, and/or any other information describing the geographic boundary of the network coverage hole 120. For example, the initial target location 125 can correspond to a cell site servicing the geographic area corresponding to the network coverage hole 120. In some examples, such as those in which the coverage hole 120 is not associated with a particular cell site (or is associated with multiple adjacent cell sites), the command center 110 determines the initial target location 125 to correspond to the geographic centroid of the coverage hole 120. In some examples, the command center 110 initializes the fleet of drones 105A-G with the same initial target location 125, whereas in other examples, the command center 110 initializes the fleet of drones 105A-G with the respective different initial target locations that are offset from the desired initial target location 125 (e.g., to reduce the risk of collision). After initializing the fleet of drones 105A-G with information specifying the network coverage hole 120, the command center 110 deploys (via one or more commands sent via the network 115), the drones 105A-G, which causes the drones to navigate to the configured initial target location 125 of the network coverage hole 120 (which is represented by the directed arrow 130 in FIG. 1A).

Turning to FIG. 1B, after being deployed by the example command center 110, the fleet of drones 105A-G navigate to their respective configured initial target locations (which may be the same or different from the initial target locations 125). After reaching their configured initial target locations, each drone 105A-G activates the portable base station(s) included in its respective payload unit to implement a respective network coverage zone to supplement network coverage in the coverage hole 120. The portable base station(s) of each drone 105A-G provides switching functionality so that communication devices (e.g., mobile devices, fixed wireless devices, etc.) in the network coverage zone of the respective drone 105A-G can connect to the portable base station(s), and then to the larger communication network for which coverage is being supplemented. For example, as illustrated in FIG. 1B, the drone 105A-G provide respective example network coverage zones 135A-G in the example environment of use 100. However, as illustrated in the example of FIG. 1B, after arriving at their respective configured initial target locations, which may be the same as or relatively close to the initial target locations 125, the drones 105A-G may be grouped such that their network coverage zones 135A-G overlap substantially and do not supplement network coverage over the entirety, or a substantial portion, of the coverage hole 120.

Accordingly, after reaching their respective configured initial target locations, the drones 105A-G, individually and/or in combination with the command center 110, implement self-organizing, autonomous positioning to effect deployment of the drones 105A-G at the specified network coverage hole 120. In some examples of such a self-organizing, autonomous positioning procedure, the position of each given drone 105A-G is updated autonomously to satisfy a condition specified by the following two rules: (1) the given drone's coverage zone 135A-G should overlap the network coverage hole 120, and (2) the given drone's coverage zone 135A-G should not overlap another drone's coverage zone 135A-G, or such overlap should be reduced as much as possible. As illustrated in the example of FIG. 1C, as the position of each drone 105A-G is updated according to both rules, the drones 105A-G will spread out from the initial target location to cover the network coverage hole 120 (assuming the total number of drones 105A-G is sufficient in view of the coverage zone 135A-G provided by each drone). In some examples, each drone 105A-G implements autonomous positioning locally and autonomously upon reaching its specified initial target location. In some examples, the drones 105A-G provide positioning and monitored signal strength measurements to the command center 110 (or other central controller), which uses the reported information to implement self-organizing, autonomous positioning for each drone 105A-G. In such examples, the command center 110 (or other central controller) then sends commands to the drones 105A-G to cause them to update their respective positions accordingly.

In some examples, the size of the coverage zone 135A-G for a particular drone 105A-G is preconfigured or calculated based on the communication range corresponding to the portable base station functionality implemented by the particular drone 105A-G. In some examples, each of the drones 105A-G monitors its current position (e.g., via the global positioning system (GPS) and/or other location determination technique(s)) and uses its monitored position, the size of its coverage zone 135A-G, and the size and initial target location configured for the network coverage hole 120 to determine whether the drone's coverage zone overlaps the network coverage hole 120. In some examples, each of the drones 105A-G also performs network signal monitoring to monitor for portable base station communication signals being transmitted by other drones. In some examples, a given drone 105A-G uses such monitored signal measurements locally to determine whether its coverage zone 135A-G overlaps another drone's coverage zone 135A-G. In some examples, the drones 105A-G additionally or alternatively report their current position and monitored signal measurements to the command center 110 (or other central controller), which uses the reported information to determine whether each drone's coverage zone 135A-G overlaps the network coverage hole 120 and/or overlaps another drone's coverage zone 135A-G.

In some examples, the fleet of drones 105A-G remain deployed at the network coverage hole 120 until the network coverage hole 120 is no longer detected at that location (e.g., when service is restored). In some examples, the fleet of drones 105A-G may be recalled by the command center 110 in response to the command center 110 detecting, from the monitored network status data, that the network coverage hole 120 has been resolved. In some examples, the fleet of drones 105A-G may be recalled manually in response to a user input.

In some examples, the command center 110 can deploy the fleet of drones 105A-G preemptively, rather than reactively, to provide coverage in a geographic area that is not experiencing a network coverage hole, but may experience one in the future. For example, the command center 110 may be used to preemptively deploy the fleet of drones 105A-G to a cell site before the cell site is expected to undergo scheduled maintenance. In some such examples, the fleet of drones 105A-G may remain deployed until recalled by a technician servicing the particular cell site.

Although the illustrated example environment of use 100 of FIGS. 1A-C is depicted as including one fleet of seven drones 105A-G, one command center 110 and one network coverage hole 120, the teaching of this disclosure can be used with any number of drone fleets containing any numbers of drones 105A-G controlled by any number of command centers 110 to reactively and/or proactively supplement network coverage for any number of detected or predicted coverage holes 120. For example, multiple example command centers 110 can be included in the example environment of use 100 to provide redundancy, to group management of drone fleets according to different criteria, to segment an operational area into multiple regions, etc.

Figure 2:
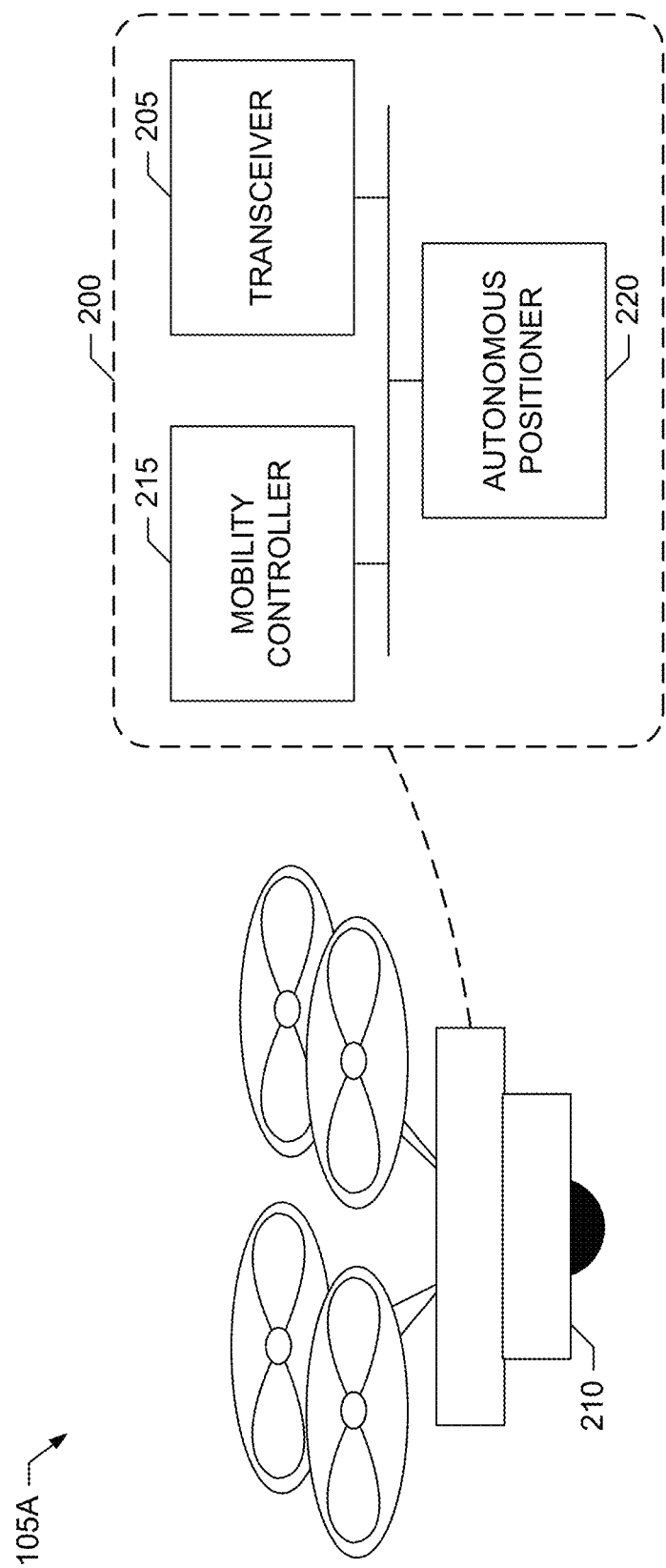
FIG. 2 is a block diagram of an example implementation of one of the drones illustrated in FIGS. 1A-C, which includes an example drone processing unit implemented in accordance with the teachings of this disclosure.

A block diagram of an example implementation of the drone 105A of FIGS. 1A-C, which includes an example drone processing unit 200 implemented in accordance with the teachings of this disclosure, is illustrated in FIG. 2. Although FIG. 2 illustrates an example implementation of the drone 105A, one or more of the other example drones 105B-G could additionally or alternatively be implemented in accordance with the example of FIG. 2. The example drone processing unit 200 of the example drone 105A of FIG. 2 includes an example transceiver 205 having one or more transceiver modules to implement the appropriate physical layer(s) and protocol stack(s) to enable communication via the example communication network 115 of FIG. 1. For example, the transceiver 205 may include an example LTE transceiver module implementing the LTE physical layer and LTE protocol stack, and/or any other 4G and/or 3G transceiver module(s), and/or any satellite network transceiver module(s), etc.

In the illustrated example of FIG. 2, the transceiver 205 receives control messages via the communication network 115 from the example command center 110 of FIG. 1 to control operation of the drone 105A. The example transceiver 205 also transmits feedback and/or other response messages to the command center 110 via the communication network 115. For example, the transceiver 205 can receive commands from the command center 110 to control operation of an example portable base station 210 included in the drone 105A. For example, the transceiver 205 can receive command(s) from the command center 110 to activate the portable base station 210 when the drone 105A reports that it has reached its configured initial target location. Additionally or alternatively, the transceiver 205 can receive command(s) from the command center 110 to deactivate the portable base station 210, etc. In some examples, the transceiver 205 additionally or alternatively transmits measurement reports to the command center 110 containing signal measurements determined by the portable base station 210 for communication signals (e.g., pilot signals, broadcast signals, etc.) detected by the portable base station 210 from one or more of the other drones 105B-G.

The example drone processing unit 200 of FIG. 2 also includes an example mobility controller 215 to control the flight control unit of the example drone 105A. In the illustrated example, the mobility controller 215 implements any control and feedback operations appropriate for interacting with the avionics, control actuators, and/or other equipment included in the flight control unit to fly the drone 105A. In some examples, the mobility controller 215 receives command(s) via the transceiver 205 from the example command center 110 to, for example, configure a flight plan, deploy the drone, navigate the drone, etc. In some examples, the mobility controller 215 reports feedback and other information to the command center 110 via the transceiver 205 to enable the command center 110 to determine the appropriate control command(s) to send to the drone 105A.

The example drone processing unit 200 of FIG. 2 further includes an example autonomous positioner 220 to implement self-organizing, autonomous positioning of the drone 105A in accordance with the teachings of this disclosure. The autonomous positioner 220 of the illustrated example is initialized by the command center 110 (e.g., via messages received via the transceiver 205) with an initial target location, such as the initial target location 125, and a size and/or other boundary information for a coverage area, such as the network coverage hole 120, for which network coverage is to be supplemented. The autonomous positioner 220 of the illustrated example may also be pre-configured or initialized by the command center 110 (e.g., via messages received via the transceiver 205) with a size of the coverage zone 135A implemented by the portable base station 210 of the drone 105A. The example autonomous positioner 220 also monitors the current position of the drone 105A (e.g., via GPS and/or other location determination techniques).

In some examples, upon reaching the configured initial target location (as determined by comparing the drone's monitored position with the configured initial target location), the autonomous positioner 220 automatically activates the portable base station 210 to implement network cell providing the first coverage zone 135A (e.g., without receiving a command from the command center 110). Also, upon reaching the configured initial target location, the autonomous positioner 220 monitors for communication signals (e.g., pilot signals, broadcast signals, etc.) transmitted by other drones, such as one or more of the drones 105B-G, to determine whether the coverage zone 135A implemented by the portable base station 210 of the drone 105A overlaps any one or more of the coverage zone(s) 135B-G implemented by the other drone(s) 105B-G. For example, the autonomous positioner 220 may receive signal measurements for monitored communication signals from the portable base station 210, from the transceiver 205, or a combination of the two. The example autonomous positioner 220 then uses the monitored signal measurements, the monitored position of the drone 105A, the configured size of the coverage zone 135A provided by the drone 105A, and the configured size and/or boundary description of the coverage area 120 to autonomously adjust a position of the drone 105A to maintain overlapping of its coverage zone 135A with the coverage area 120, but to reduce an amount of overlap of the coverage zone 135A of the drone 105A with the coverage zone(s) 135B-G of the other drones 105B-G.

In some examples, the monitoring performed by the autonomous positioner 220 of the drone 105A include measuring (e.g., with the portable base station 210 and/or the transceiver 205) a first signal strength of a communication signal received from another (e.g., second) drone, such as the drone 105B. The autonomous positioner 220 in such examples can determine the coverage zone 135A provided by the drone 105A and the coverage zone 135B provided by the drone 105B overlap when the first signal strength of the communication signal meets (e.g., is greater than or equal to) a zone overlap threshold value. For example, the zone overlap threshold value may be specified in initialization information (e.g., received from the command center 110 via the transceiver 205) and may represent a threshold strength of a received signal that would be considered to interfere with (and, thus, overlap) the signals transmitted by the portable base station 210 implementing the coverage zone 135A of the drone 105A. The example autonomous positioner 220 can repeat this foregoing procedure for other drone(s) for which communication signals can be detected and measured to determine whether the coverage zone 135A of the drone 105A overlaps with any of the coverage zone(s) provided by the other drone(s).

In some examples, the autonomous positioner 220 of the drone 105A autonomously adjusts the position of the drone 105A by measuring the position of the drone 105A after adjusting the drone 105A to move by a first distance in a first direction (e.g., by providing appropriate commands to the mobility controller 215). The example autonomous positioner 220 also re-measures the communication signal received from the drone 105B after adjusting the drone 105A to move by the first distance in the first direction to determine a second (e.g., updated) signal strength associated with the drone 105B. The example autonomous positioner 220 then autonomously adjusts the position of the drone 105A by a second distance in a second direction based on the second signal strength, the measured position of the drone 105A, the size of the coverage zone 135A, and the size/boundary of the coverage area 120 for which network coverage is to be supplemented.

For example, the autonomous positioner 220 may select the second direction to reposition the drone 105A to correspond to the first direction in which the drone 105A previously moved in response to determining a first condition is satisfied. In some examples, the first condition is satisfied when (1) the second signal strength measured for the communication signal received from the drone 105B both (a) is less than the first signal strength measured for this same signal (indicating movement in the first direction caused the overlap to lessen) and (b) still meets the zone overlap threshold value (indicating there is still overlap to be reduced), and (2) at least a portion of the coverage zone 135A is determined to overlap the coverage area 120 based on the measured position of the drone 105A, the size of the coverage zone 135A, and the size/location of the coverage area 120 (e.g., indicating at least a portion the coverage zone 135A still resides in the coverage area 120 for which network coverage is to be supplemented). However, the autonomous positioner 220 may select the second direction to reposition the drone 105A to be different from the first direction in which the drone 105A previously moved in response to determining the first condition is not satisfied (e.g., when either or both elements/rules forming the first condition is/are not satisfied).

In some examples, the second distance over which the drone 105A is to be repositioned is a specified or pre-configured incremental distance (e.g., a fixed distance). However, in some examples, the autonomous positioner 220 determines the second distance over which the drone 105A is to be repositioned based on (e.g., proportional to) the second signal strength measured for the communication signal received from the drone 105B. For example, if the second signal strength measured for the communication signal received from the drone 105B is relatively large, the autonomous positioner 220 may determine the second distance to be a relatively large distance along the second direction, with the goal of reducing the overlap between the coverage zone 135A provided by the drone 105A and the coverage zone 135B provided by the drone 105B quickly. However, if the second signal strength measured for the communication signal received from the drone 105B is relatively small, the autonomous positioner 220 may determine the second distance to be a relatively small distance along the second direction, with the goal of maintaining a relatively small (or no) overlap between the coverage zone 135A provided by the drone 105A and the coverage zone 135B provided by the drone 105B. Additionally or alternatively, the autonomous positioner 220 may determine the second distance to be a relatively large distance along the second direction when the coverage zone 135A provided by the drone 105A is determined to be outside of (or not overlap) the coverage area 120, with the goal of attaining overlap quickly. However, the autonomous positioner 220 may determine the second distance to be a relatively small distance along the second direction when the coverage zone 135A provided by the drone 105A is determined to overlap the coverage area 120, with the goal of maintaining this overlap.

The example autonomous positioner 220 can repeat this foregoing procedure for other drone(s) for which communication signals can be detected and measured to autonomously adjust the position of the drone 105A to reduce overlap of the coverage zone 135A of the drone 105A with the coverage zone(s) provided by the other drone(s), while maintaining overlap of the coverage zone 135A with the coverage area 120. Further details concerning the example autonomous positioner 220 of FIG. 2 are provided below.

While an example manner of implementing the drone processing unit 200 is illustrated in FIG. 2, one or more of the elements, processes and/or devices illustrated in FIG. 2 may be combined, divided, re-arranged, omitted, eliminated and/or implemented in any other way. Further, the example transceiver 205, the example portable base station 210, the example mobility controller 215, the example autonomous positioner 220 and/or, more generally, the example drone processing unit 200 of FIG. 2 may be implemented by hardware, software, firmware and/or any combination of hardware, software and/or firmware. Thus, for example, any of the example transceiver 205, the example portable base station 210, the example mobility controller 215, the example autonomous positioner 220 and/or, more generally, the example drone processing unit 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example drone processing unit 200, the example transceiver 205, the example portable base station 210, the example mobility controller 215 and/or the example autonomous positioner 220 is/are hereby expressly defined to include a tangible computer readable storage device or storage disk such as a memory, a digital versatile disk (DVD), a compact disk (CD), a Blu-ray disk, etc. storing the software and/or firmware. Further still, the example drone processing unit 200 of FIG. 2 may include one or more elements, processes and/or devices in addition to, or instead of, those illustrated in FIG. 2, and/or may include more than one of any or all of the illustrated elements, processes and devices.

Figure 3:
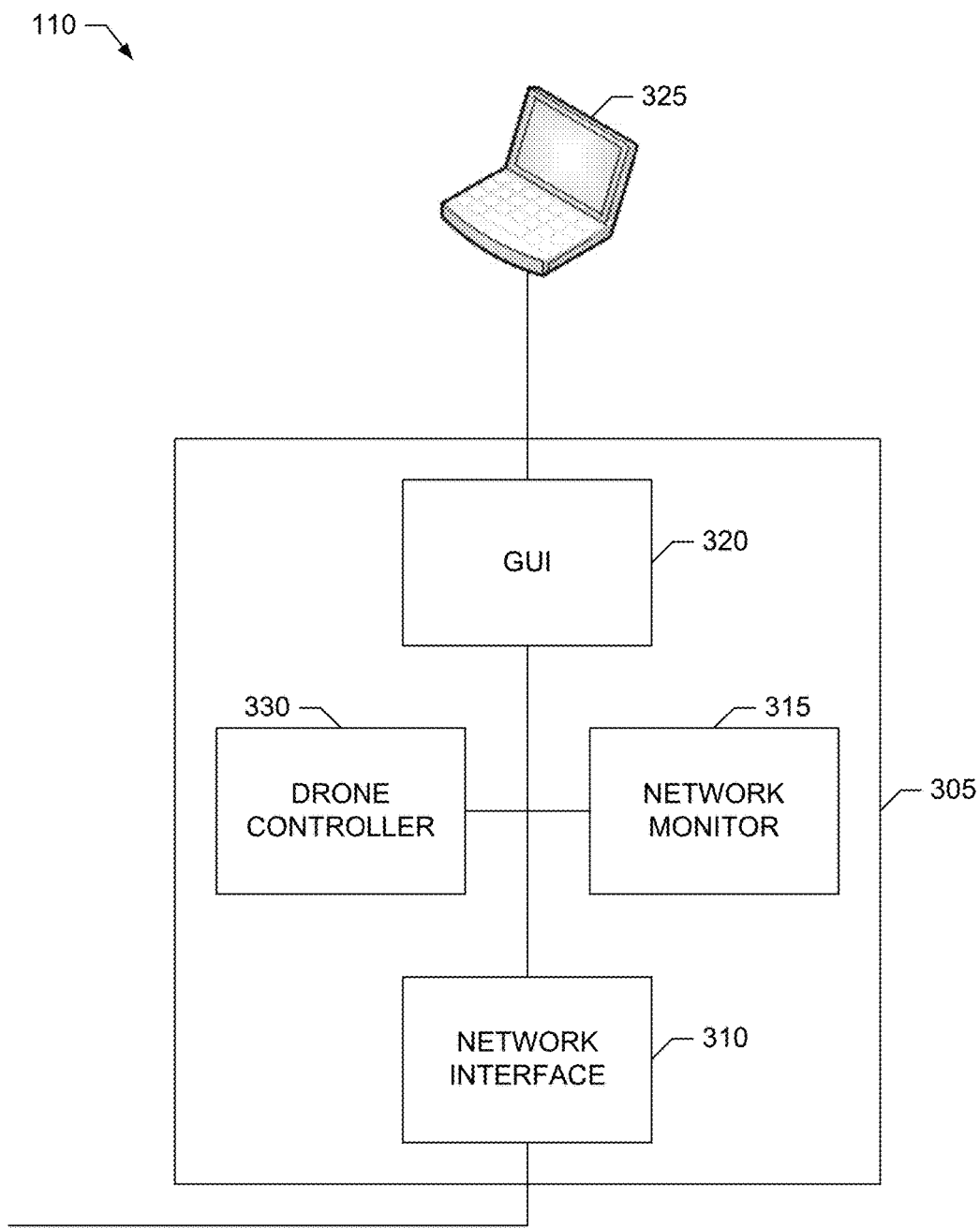
FIG. 3 is a block diagram of an example implementation of the example command center illustrated in FIGS. 1A-C

A block diagram of an example implementation of the command center 110 of FIG. 1 is illustrated in FIG. 3. The example command center 110 includes an example drone manager 305, which further includes an example network interface 310 to communicate with one or more communication networks, links, etc., to interface the command center 110 with the example communication network 115. In examples in which the communication network 115 is different from another communication network for which coverage is to be supplemented by the fleet of drones 105A-G, the example network interface 310 is also structured to interface with that other network. For example, the network interface 310 can be implemented by any type(s), number(s) and/or combination(s) of interfaces, such as the example interface circuit 1120 of FIG. 11, which is described in further detail below.

The example drone manager 305 also includes an example network monitor 315 to monitor the status of the communication network for which coverage can be supplemented by the fleet of drones 105A-G. For example, the network monitor 315 receives, via the network interface 310, monitored network status data, such as monitored signal strength/quality data, monitored network capacity data, etc., from monitoring locations (e.g., such as cell sites) in a communication network for which coverage can be supplemented by the fleet of drones 105A-G (e.g., which may be the same as, or different from, the communication network 115). In some examples, the network monitor 315 receives the status data for the communication network being monitored in real-time, at given reporting intervals, etc. In some examples, the network monitor 315 compares the monitored network status data with prior (e.g., reference) network coverage map(s) to detect network coverage holes, such as the example network coverage hole 120. As described above, a network coverage hole can correspond to a cell site that has a monitored signal strength/quality that is lower than expected per the network coverage map, and/or that has a monitored available capacity that is lower than expected per the network coverage map, etc.

In the illustrated example of FIG. 3, the network monitor 315 utilizes an example graphical user interface (GUI) 320 of the example drone manager 305 to present a map depicting detected network coverage hole(s) on a display of an example computing device 325. The example computing device 325 can be implemented by any number and/or type(s) of computing devices, such as one or more computers, terminals, tablets, mobile devices, etc.

The example drone manager 305 of FIG. 3 further includes an example drone controller 330 to control operation of one or more fleets of drones, such as to deploy the fleet of drones 105A-G to a target geographic location associated with a detected network coverage hole, such as the network coverage hole 120. For example, the drone controller 330 initializes (e.g., via one or more commands sent via the network interface 310) the drones 105A-G with an example initial target location 125 associated with a network coverage hole, such as the network coverage hole 120, detected by the network monitor 315, as well as a size of the network coverage hole 120, and/or any other boundary specifications describing the network coverage hole 120. For example, the initial target location 125 can correspond to a cell site servicing the geographic area corresponding to the network coverage hole 120. In some examples, such as those in which the coverage hole 120 is not associated with a particular cell site (or is associated with multiple adjacent cell sites), the drone controller 330 determines the initial target location 125 to correspond to the geographic centroid of the coverage hole 120. In some examples, the drone controller 330 initializes the fleet of drones 105A-G with the same initial target location 125, whereas in other examples, the drone controller 330 initializes the fleet of drones 105A-G with the respective different initial target locations that are offset from the desired initial target location 125 (e.g., to reduce the risk of collision). After initializing the fleet of drones 105A-G with information specifying the network coverage hole 120, the drone controller 330 deploys (e.g., via one or more commands sent via the network interface 310), the drones 105A-G, which causes the drones to navigate to the network coverage hole 120.

In some examples, the drone controller 330 receives (e.g., via the network interface 310) reporting messages from respective ones of the drones 105A-G, which include one or more of the current monitored positions of the drones 105A-G, signal strengths of communication signals detected by the drones 105A-G, drone operational status (e.g., remaining power reports, warning indications, failure indications, etc.). In some examples, the drone controller 330 activates (e.g., via one or more commands sent via the network interface 310) the portable base station of each of the drones 105A-G when the drone controller 330 determines, based on the reported drone positions, that the drone has reached the network coverage hole 120. Additionally or alternatively, in some examples, the drone controller 330 implements positioning functionality, as described above and in further detail below, to reposition the drones 105A-G (e.g., via one or more commands sent via the network interface 310) to spread out over the network coverage hole 120 while reducing overlap among the coverage zones 135A-G provided by the respective drones 105A-G.

In the illustrated example, when the network monitor 315 determines, based on the monitored network status data, that the network coverage hole 120 has been resolved (e.g., service has been restored), the drone manager 305 recalls (e.g., via one or more commands sent via the network interface 310) the fleet of drones 105A-G to their staging area(s). In some examples, the drone manager 305 can recall the fleet of drones 105A-G in response to a user input received from the computing device 325 via the GUI 320.

In some examples, the drone manager 305 can be used to preemptively deploy the fleet of drones 105A-G to supplement network coverage in a geographic area (e.g., not experiencing a network coverage hole, but which may experience a network coverage hole in the future) in response to one or more user inputs received from the computing device 325 via the GUI 320, and/or remotely via the network interface 310. For example, in response to a user input received via the GUI 320, the drone manager 305 may be used to preemptively deploy the fleet of drones 105A-G to a cell site before the cell site is expected to undergo scheduled maintenance. Thereafter, in response to a user input received from an on-site technician via the network interface 310, the drone manager 305 may recall the fleet of drones 105A-G to their respective staging area(s).

While an example manner of implementing the command center 110 of FIGS. 1A-C is illustrated in FIG. 3, one or more of the elements, processes and/or devices illustrated in FIG. 3 may be combined, divided, re-arranged, omitted, eliminated and/or implemented in any other way. Further, the example drone manager 305, the example network interface 310, the example network monitor 315, the example GUI 320, the example computing device 325, the example drone controller 330 and/or, more generally, the example command center 110 of FIG. 3 may be implemented by hardware, software, firmware and/or any combination of hardware, software and/or firmware. Thus, for example, any of the example drone manager 305, the example network interface 310, the example network monitor 315, the example GUI 320, the example computing device 325, the example drone controller 330 and/or, more generally, the example command center 110 could be implemented by one or more analog or digital circuit(s), logic circuits, programmable processor(s), ASIC(s), PLD(s) and/or FPLD(s). When reading any of the apparatus or system claims of this patent to cover a purely software and/or firmware implementation, at least one of the example command center 110, the example drone manager 305, the example network interface 310, the example network monitor 315, the example GUI 320, the example computing device 325 and/or the example drone controller 330 is/are hereby expressly defined to include a tangible computer readable storage device or storage disk such as a memory, a DVD, a CD, a Blu-ray disk, etc. storing the software and/or firmware. Further still, the example command center 110 of FIGS. 1A-C may include one or more elements, processes and/or devices in addition to, or instead of, those illustrated in FIG. 3, and/or may include more than one of any or all of the illustrated elements, processes and devices.

Flowcharts representative of example machine readable instructions for implementing the example drone processing unit 200, the example transceiver 205, the example portable base station 210, the example mobility controller 215, the example autonomous positioner 220, the example command center 110, the example drone manager 305, the example network interface 310, the example network monitor 315, the example GUI 320, the example computing device 325 and/or the example drone controller 330 are shown in FIGS. 4-9. In these examples, the machine readable instructions comprise one or more programs for execution by a processor, such as the processors 1012 and/or 1112 shown in the example processor platforms 1000 and/or 1100 discussed below in connection with FIGS. 10 and 11. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processors 1012 and/or 1112, but the entire program or programs and/or portions thereof could alternatively be executed by a device other than the processors 1012 and/or 1112, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 4-9, many other methods of implementing the example drone processing unit 200, the example transceiver 205, the example portable base station 210, the example mobility controller 215, the example autonomous positioner 220, the example command center 110, the example drone manager 305, the example network interface 310, the example network monitor 315, the example GUI 320, the example computing device 325 and/or the example drone controller 330 may alternatively be used. For example, with reference to the flowcharts illustrated in FIGS. 4-9, the order of execution of the blocks may be changed, and/or some of the blocks described may be changed, eliminated, combined and/or subdivided into multiple blocks.

As mentioned above, the example processes of FIGS. 4-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-9 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

Figure 4:
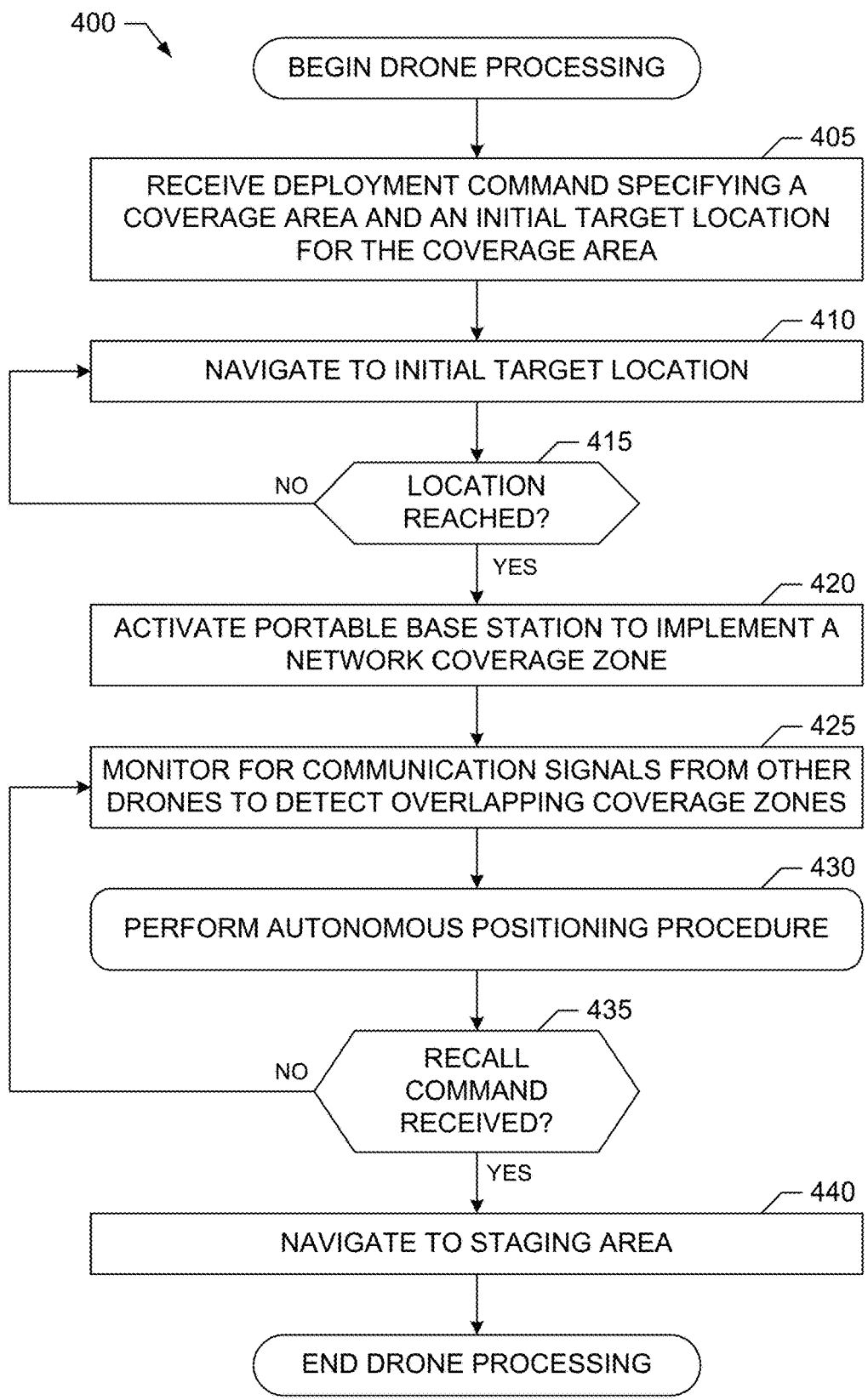
FIG. 4 is a flowchart representative of example machine readable instructions that may be executed to implement the example drone processing unit of FIG. 2.

An example program 400 that may be executed to implement the example drone processing unit 200 of FIG. 2 is represented by the flowchart shown in FIG. 4. For convenience, and without loss of generality, execution of the example program 400 is described from the perspective of the example drone processing unit 200 being used to implement the example drone 105A. With reference to the preceding figures and associated written descriptions, the example program 400 of FIG. 4 begins execution at block 405 at which the example autonomous positioner 220 of the drone processing unit 200 receives (e.g., via the example transceiver 205) a deployment command from the example command center 110 specifying a coverage area, such as the coverage area 120, and an initial target location, such as the initial target location 125, for the coverage area 120 for which network coverage is to be supplemented. At block 410, the autonomous positioner 220 triggers the example mobility controller 215 of the drone processing unit 200 to navigate the drone 105A to the initial target location 125. For example, the mobility controller 215 may navigate the drone 105A to the initial target location 125 autonomously based on a flight plan received from the command center 110, and/or via commands received from the command center 110, etc.

When the first drone 105A reaches the initial target location 125 (e.g., as determined by comparing the drone's monitored position with the initial target location 125) (block 415), processing proceeds to block 420. At block 420, the example portable base station 210 of the first drone 105A is activated to implement the drone's network coverage zone 135A. In some examples, the portable base station 210 is activated automatically at block 420 by the autonomous positioner 220 in response to the autonomous positioner 220 determining that the drone's monitored position coincides with, or is within a threshold distance from, the initial target location 125. In some examples, the portable base station 210 is activated remotely by the command center 110 in response to the command center 110 determining (e.g., based on reported positioning measurements) that the drone's monitored position coincides with, or is within a threshold distance from, the initial target location 125.

At block 425, when the first drone 105A reaches the initial target location 125, the autonomous positioner 220 monitors for communication signals (e.g., pilot signals, broadcast signals, etc.) transmitted by other drones, such as one or more of the drones 105B-G, to determine whether the coverage zone 135A implemented by the portable base station 210 of the drone 105A overlaps any one or more of the coverage zone(s) 135B-G implemented by the other drone(s) 105B-G, as described above. At block 430, the autonomous positioner 220 performs an autonomous positioning procedure via which the autonomous positioner 220 adjusts the position of the drone 105A autonomously, as described above, to maintain overlapping of the drone's coverage zone 135A with the coverage area 120, but to reduce an amount of overlap of the coverage zone 135A of the drone 105A with the coverage zone(s) 135B-G of the other drones 105B-G. Example instructions that may be executed to implement the processing at block 430 are illustrated in FIGS. 5 and 6, which are described in further detail below.

At block 435, the autonomous positioner 220 determines whether a recall command has been received (e.g., via the transceiver 205) from the command center 110. If a recall command has not been received (block 435), control returns to block 425 and blocks subsequent thereto to enable the position of the drone 105A to continue being adjusted while the drone 105A is supplementing network coverage in the coverage area 120. However, if a recall command is received (block 435), then at block 440 the mobility controller 215 navigates (e.g., autonomously based on a flight plan received from the command center 110, and/or via commands received from the command center 110) the drone 105A back to a staging area. Execution of the example program 400 then ends.

Figure 5:
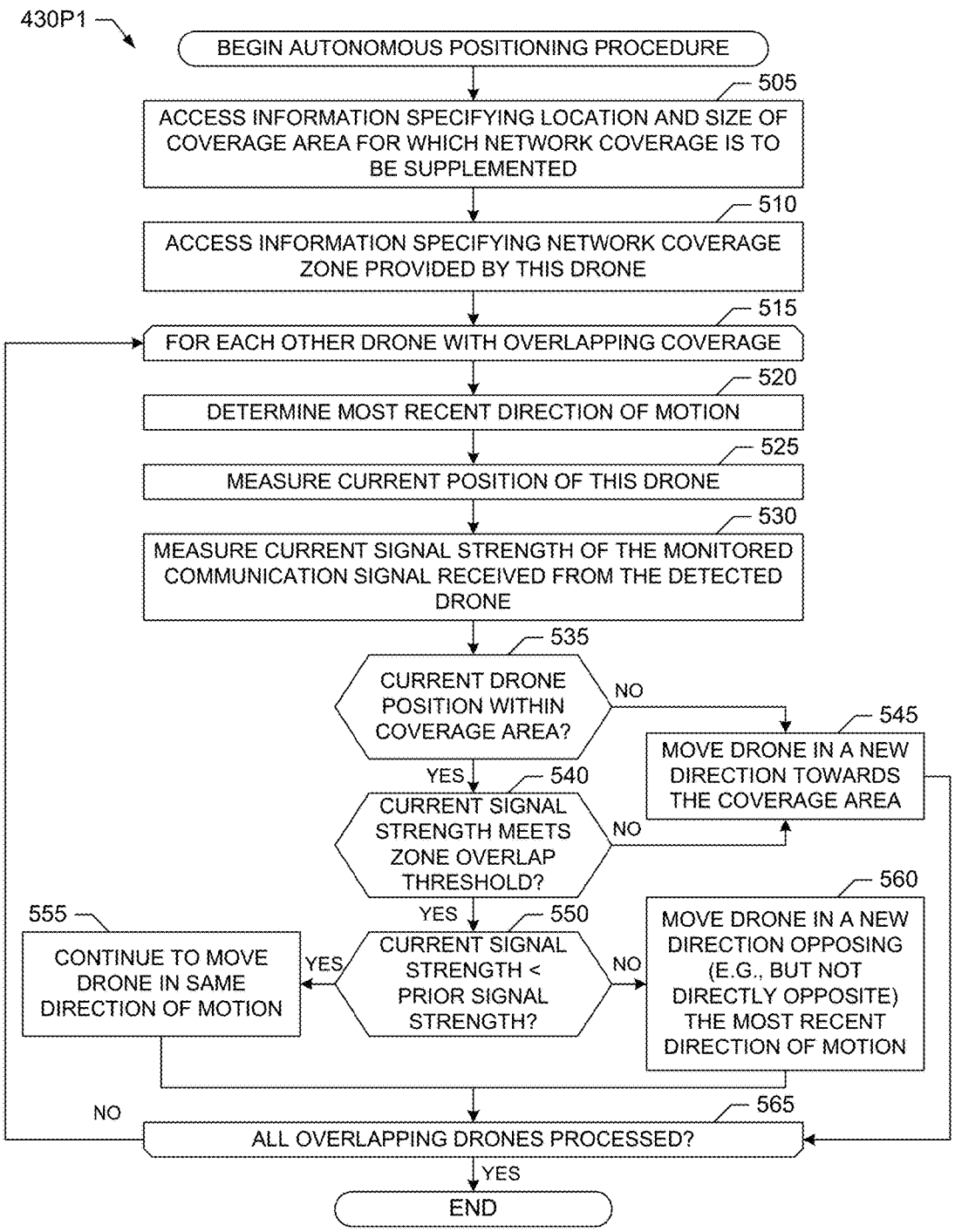
FIGS. 5 and 6 are flowcharts representative of example machine readable instructions that may be used to implement drone positioning aspects of the example instructions of FIG. 4.
Figure 6:
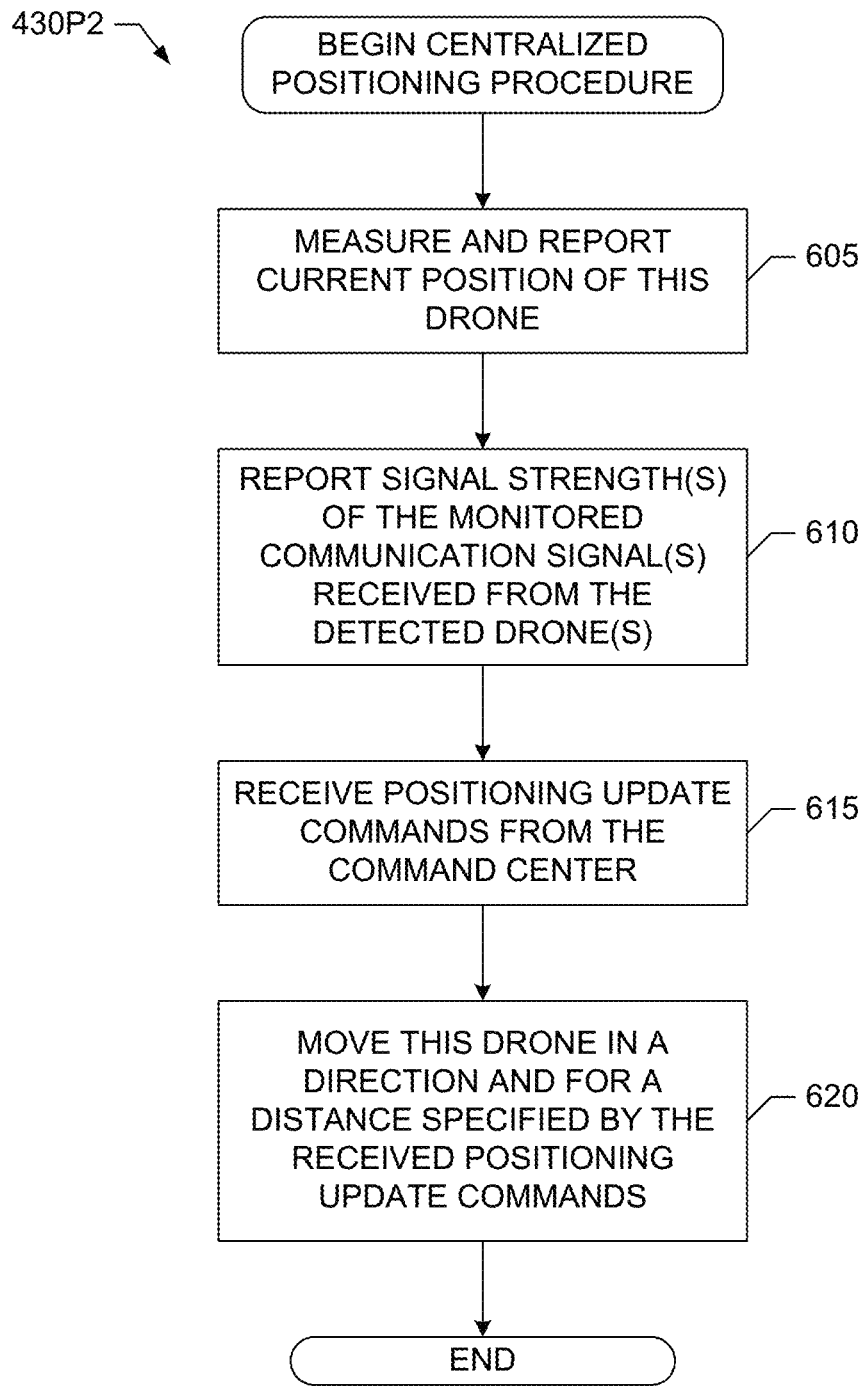

A first example program 430P1 that may be executed to implement the processing at block 430 of FIG. 4 to perform an autonomous positioning procedure for the example drone processing unit 200 of FIG. 2 is represented by the flowchart shown in FIG. 5. For convenience, and without loss of generality, execution of the example program 430P1 is described from the perspective of the example drone processing unit 200 being used to implement the example drone 105A. With reference to the preceding figures and associated written descriptions, the example program 430P1 of FIG. 5 begins execution at block 505 at which the example autonomous positioner 220 of the drone processing unit 200 accesses information specifying an initial target location, such as the example initial target location 125, and the size of an example coverage area, such as the example coverage area 120, for which network coverage is to be supplemented. At block 510, the autonomous positioner 220 accesses information specifying the size of the network coverage zone 135A provided by the drone 105A. At block 515, the autonomous positioner 220 begins cycling through the other drone(s) detected at block 425 of FIG. 4 as having overlapping coverage zone(s) with processing network coverage zone 135A provided by the drone 105A. For example, at block 515, the autonomous positioner 220 can cycle through the other detected drones in order from largest overlap (e.g., corresponding to largest measured signal strength) to smallest overlap (e.g., corresponding to smallest measured signal strength).

For example, assume that the autonomous positioner 220 determined at block 425 of FIG. 4 that the drone 105B had the largest measured signal strength and, thus, the largest coverage zone overlap with the drone 105A. At block 520 of FIG. 5, the autonomous positioner 220 determines the most recent (e.g., first) direction of motion in which the drone 105A was moved. At block 525, the autonomous positioner 220 determines the current position of the drone 105A. At block 530, the autonomous positioner 220 measures (e.g., via the example portable base station 210 and/or the example transceiver of FIG. 2) the current signal strength of the monitored communication signal (e.g., pilot signal, broadcast signal, etc.) being received from the drone 105B. If the current position of the drone 105A is outside the coverage area 120 (or the coverage zone 135A of the drone 105A does not overlap the coverage area 120) (block 535), or the current signal strength measured for the drone 105B does not meet the coverage zone overlap threshold (and, thus, the drones 105A and 105B do not have overlapping coverage zones) (block 540), then processing proceeds to block 545. At block 545, the autonomous positioner 220 configures the example mobility controller 215 of the drone processing unit 200 to move the drone 105A in a new (e.g., second) direction towards the coverage area 120. For example, the autonomous positioner 220 may determine the new direction to be towards the initial target location 125 of the coverage area 120, but not directly along or opposite the most recent (e.g., first) direction motion. This avoids having the drone 105A oscillate along a single motion vector.

However, if the current position of the drone 105A is within the coverage area 120 (or the coverage zone 135A of the drone 105A overlaps the coverage area 120) (block 535) and the current signal strength measured for the drone 105B meets the coverage zone overlap threshold (and, thus, the drones 105A and 105B have overlapping coverage zones) (block 540), then processing proceeds to block 550. At block 550, the autonomous positioner 220 determines whether the current signal strength measured for the drone 105B is less than the prior signal strength measured for that same drone 105B. If the current signal strength is less than the prior signal strength (block 550), then at block 555, the autonomous positioner 220 configures the mobility controller 215 to continue to move the drone 105A in the most recent (e.g., first) direction of motion (as this same direction of motion should cause the coverage zone overlap to continue to decrease). However, if the current signal strength is not less than the prior signal strength (block 550), then at block 560, the autonomous positioner 220 configures the mobility controller 215 to move the drone 105A in a new (e.g., second) direction opposing the most recent (e.g., first) direction of motion. For example, the autonomous positioner 220 may determine the new (e.g., second) direction to be greater than 90 degrees offset from the most recent (e.g., first) direction of motion, but not directly opposite (e.g., 180 degrees offset) from the most recent (e.g., first) direction of motion to avoid having the drone 105A oscillate along a single motion vector. At blocks 545, 555 and 560, the distance over which the autonomous positioner 220 configures the mobility controller 215 to move the drone 105A may be a fixed incremental distance, or a determined distance, as described above.

At block 565, the autonomous positioner 220 continues iterating over the drone(s) detected at block 425 of FIG. 4 to have coverage zone(s) overlapping with the coverage zone 135A of the drone 105A. For example, if the drone 105D is the drone with the next largest amount of coverage zone overlap, the processing returns to blocks 515 and blocks subsequent thereto to allow the autonomous positioner 220 to perform autonomous positioning of the drone 105A based on the coverage zone overlap with drone 105D. When drone(s) having coverage zone(s) overlapping with the coverage zone 135A of the drone 105A have been processed, execution of the example program 430P1 ends.

A second example program 430P2 that may be executed to implement the processing at block 430 of FIG. 4 to perform a centralized positioning procedure for the example drone processing unit 200 of FIG. 2 is represented by the flowchart shown in FIG. 6. For convenience, and without loss of generality, execution of the example program 430P2 is described from the perspective of the example drone processing unit 200 being used to implement the example drone 105A. With reference to the preceding figures and associated written descriptions, the example program 430P2 of FIG. 6 begins execution at block 605 at which the example autonomous positioner 220 of the drone processing unit 200 determines the current position of the drone 105A and reports the current position (e.g., via the example transceiver 205) to the example command center 110. At block 610, the autonomous positioner 220 reports, to the command center 110 (e.g., via the transceiver 205), the signal strengths of the monitored communication signal(s) detected, at block 425 of FIG. 4, from other(s) of the drone(s) 105B-G. In some examples, the command center 110 then implements a positioning procedure similar to blocks 515-565 of FIG. 5.

After the command center 110 determines an updated position for the drone 105A, at block 615, the example mobility controller 215 of the drone processing unit 200 receives one or more position update commands from the command center 110 (e.g., via the transceiver 205) specifying, for example, a direction and distance in which the drone 105A is to be moved. At block 620, the example mobility controller 215 moves the drone 105A in a direction and for a distance in accordance with the position update command(s) received at block 615. Execution of the example program 430P2 then ends.

Figure 7:
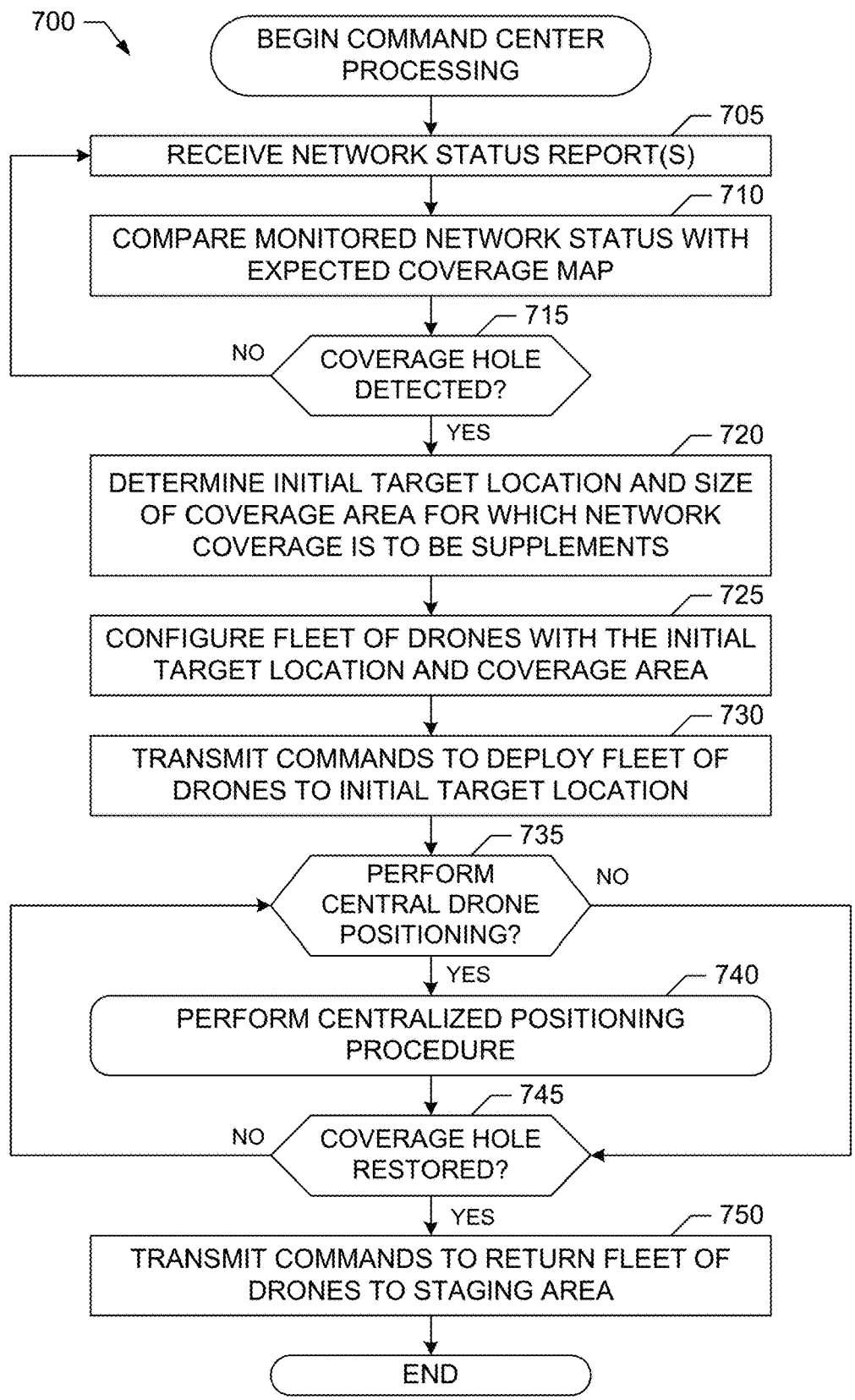
FIGS. 7 and 8 are flowcharts representative of example machine readable instructions that may be executed to implement the example command center of FIGS. 1A-C and/or 3.

A first example program 700 that may be executed to implement the example command center 110 of FIGS. 1A-C and/or 3 is represented by the flowchart shown in FIG. 7. With reference to the preceding figures and associated written descriptions, the example program 700 of FIG. 7 begins execution at block 705 at which the example network monitor 315 of the command center 110 receives network status report(s) (e.g., via the example network interface 310 of FIG. 3) from monitoring locations (e.g., such as cell sites) in a communication network for which coverage can be supplemented by the fleet of drones 105A-G. At block 710, the network monitor 315 compares the monitored network status provided by the received status report(s) with expected coverage map(s) for the monitored communication network to detect any coverage holes. If a coverage hole, such as the example coverage hole 120 is detected (block 715), processing proceeds to block 720.

At block 720, the example drone controller 330 of the command center 110 determines an initial target location, such as the example initial target location 125, for the detected coverage hole 120, as described above. The drone controller 330 also determines the size and/or boundary description for the detected coverage hole 120, as described above. At block 725, the drone controller 330 configures (e.g., via the network interface 310) the fleet of drones 105A-G with the initial target location 125 (and/or respective initial target locations based on, but offset from, the initial target location 125) and coverage area size/boundary details for the coverage area 120. At block 730, the drone controller 330 transmit commands (e.g., via the network interface 310) to deploy the fleet of drones 105A-G to the coverage area 120 for which network coverage is to be supplemented.

Figure 9:
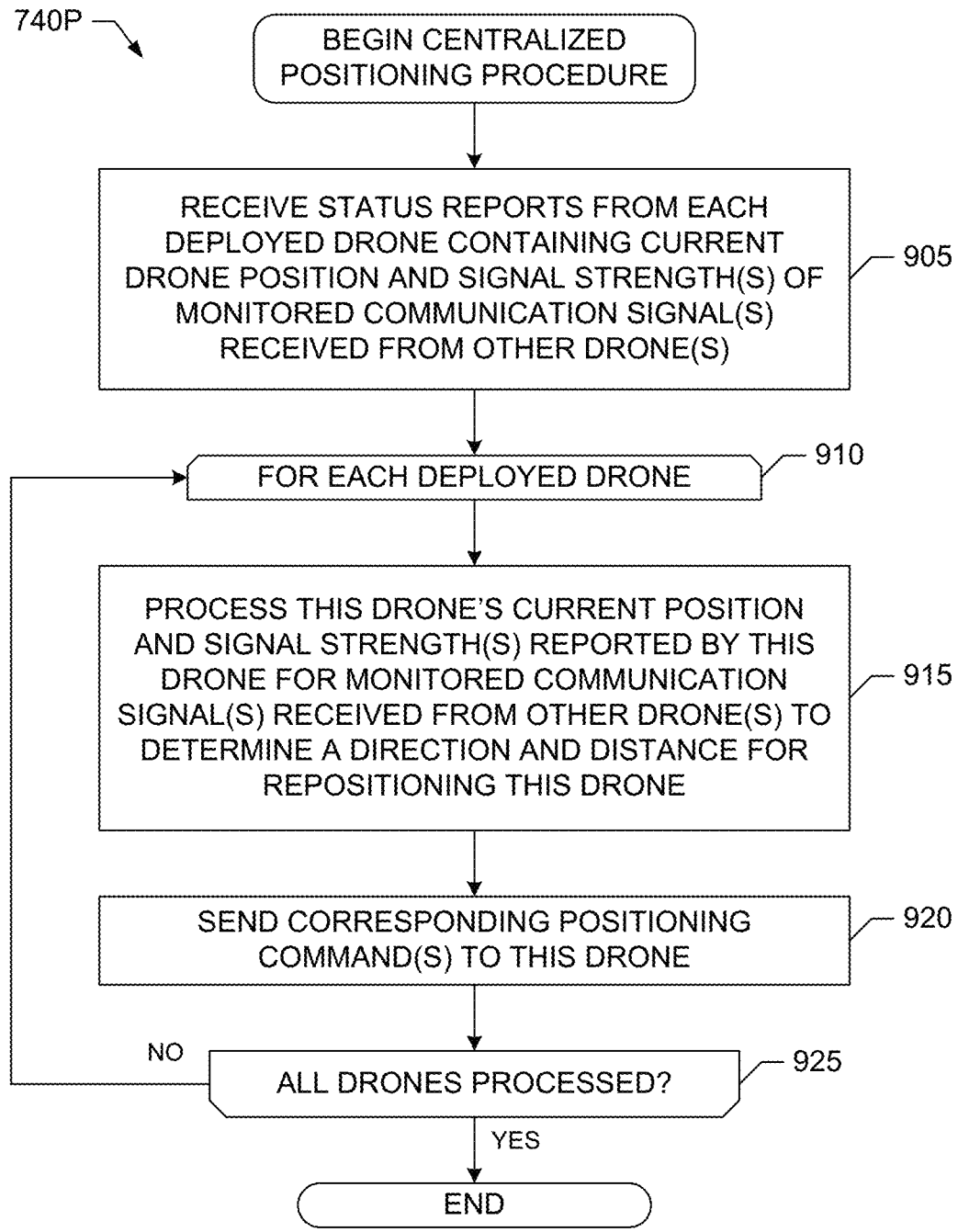
FIG. 9 is a flowchart representative of example machine readable instructions that may be used to implement drone positioning aspects of the example instructions of FIGS. 7 and/or 8.

At block 735, the drone controller 330 determines whether a centralized drone positioning procedure is to be performed for the fleet of drones 105A-G. If so (block 735), processing proceeds to block 740 at which the centralized drone positioning procedure is performed. Example instructions that may be executed to implement the processing at block 740 are illustrated in FIG. 9, which is described in further detail below.

At block 745, the drone controller 330 determines (e.g., based on the monitoring performed by the network monitor 315) whether the coverage hole 120 has been restored. If the coverage hole 120 has not been restored (block 745), processing returns to block 740 (if centralized positioning is to be performed) or the drone controller 330 waits until the coverage hole 120 has been restored. Once the coverage hole 120 has been restored (block 745), at block 750, the drone controller 330 transmits command(s) (e.g., via the network interface 310) to return the fleet of drone 105A-G to their staging area(s). Execution of the example program 700 then ends.

Figure 8:
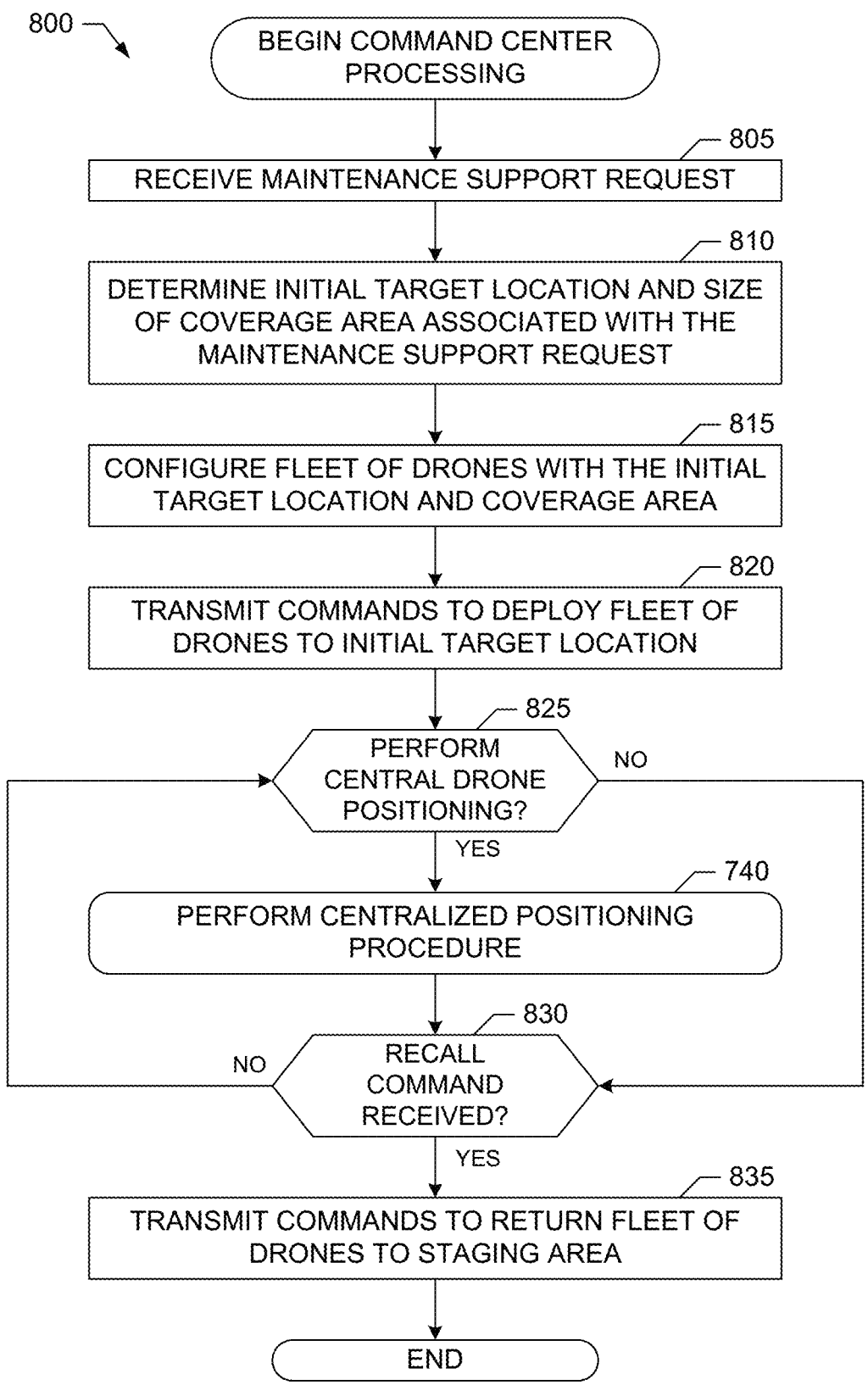

A second example program 800 that may be executed to implement the example command center 110 of FIGS. 1A-C and/or 3 is represented by the flowchart shown in FIG. 8. With reference to the preceding figures and associated written descriptions, the example program 800 of FIG. 8 begins execution at block 805 at which the example drone controller 330 of the command center 110 receives (e.g., via the example GUI 320 and/or the example network interface 310) a maintenance support request, which requests that network coverage be preemptively supplemented at a specified coverage area, such as the example coverage area 120 (e.g., before a network coverage hole occurs in that area). At block 810, the command center 110 determines an initial target location, such as the example initial target location 125, for the coverage area 120 associated with the maintenance support request. For example, the command center 110 can determine the initial target location 125 to be the location of cell site associated with the maintenance support request. At block 810, the command center 110 also determines the size and/or boundary description for the coverage area 120 associated with the maintenance support request. For example, the command center 110 can determine the size of the coverage area 120 to correspond to the expected radius of coverage supported by a cell site associated with the maintenance support request. At block 815, the drone controller 330 configures (e.g., via the network interface 310) the fleet of drones 105A-G with the initial target location 125 (and/or respective initial target locations based on, but offset from, the initial target location 125) and coverage area size/boundary details for the coverage area 120. At block 820, the drone controller 330 transmit commands (e.g., via the network interface 310) to deploy the fleet of drones 105A-G to the coverage area 120 for which network coverage is to be supplemented.

At block 825, the drone controller 330 determines whether a centralized drone positioning procedure is to be performed for the fleet of drones 105A-G. If so (block 825), processing proceeds to block 740 at which the centralized drone positioning procedure is performed. Example instructions that may be executed to implement the processing at block 740 are illustrated in FIG. 9, which is described in further detail below.

At block 830, the drone controller 330 determines whether a drone recall command has been received (e.g., via the example GUI 320 and/or the example network interface 310). If a recall command has not been received (block 830), processing returns to block 825 (if centralized positioning is to be performed) or the drone controller 330 waits until the recall command has been received. Once the recall command has been received (block 830), at block 835, the drone controller 330 transmits command(s) (e.g., via the network interface 310) to return the fleet of drone 105A-G to their staging area(s). Execution of the example program 800 then ends.

An example program 740P that may be executed to implement the processing at block 740 of FIGS. 7 and/or 8 to perform centralized positioning procedure for the example command center 110 of FIGS. 1A-C and/or 3 is represented by the flowchart shown in FIG. 9. With reference to the preceding figures and associated written descriptions, the example program 740P of FIG. 9 begins execution at block 905 at which the example drone controller 330 of the command center 110 receives (e.g., via the example network interface 310) status reports from each of the drones 105A-G that have been deployed to supplement network coverage in the coverage area 120. Each status report includes, for example, the current position of the reporting drone 105A-G and the signal strength(s) of any monitored communication signal(s) received by that drone from other(s) of the drone(s) 105A-G.

At block 910, the drone controller 330 begins determining positioning updates for each of the deployed drones 105A-G. For example, assuming the drone controller 330 begins by selecting the deployed drone 105A for processing, at block 915, the drone controller 330 processes the current position reported by the drone 105A and the signal strength(s) for the communication signal(s) received by the drone 105A from any other of the deployed drone(s) 105B-G to determine a direction and distance to reposition the drone. In the illustrated example, the drone controller 330 determines this direction and distance to both (1) cause the coverage zone 135A of the drone 105A to overlap with the coverage area 120, and (2) reduce the overlap of the coverage zone 135A of the drone 105A with the respective coverage zone(s) 135B-G of the other drone(s) 105B-G reported as having been detected by the drone 105A. For example, at block 915, the drone controller 330 may implement the example positioning procedure of example blocks 535 to 560 of FIG. 5 to process the current position reported by the drone 105A and the other drone signal strength(s) reported by the drone 105A determine the direction and distance to reposition the drone 105A. Then, at block 920, the drone controller 330 transmits (e.g., via the network interface 310) one or more commands to the drone 105A to cause the drone 105A to reposition itself according to the direction and distance determined at block 915.

At block 925, the drone controller 330 continues iterating to determine positioning updates and to send corresponding repositioning commands to the remaining ones of the deployed drones 105B-G. After the processing iteration associated with the last of the deployed drones 105A-G completes, execution of the example program 740P ends.

Figure 10:
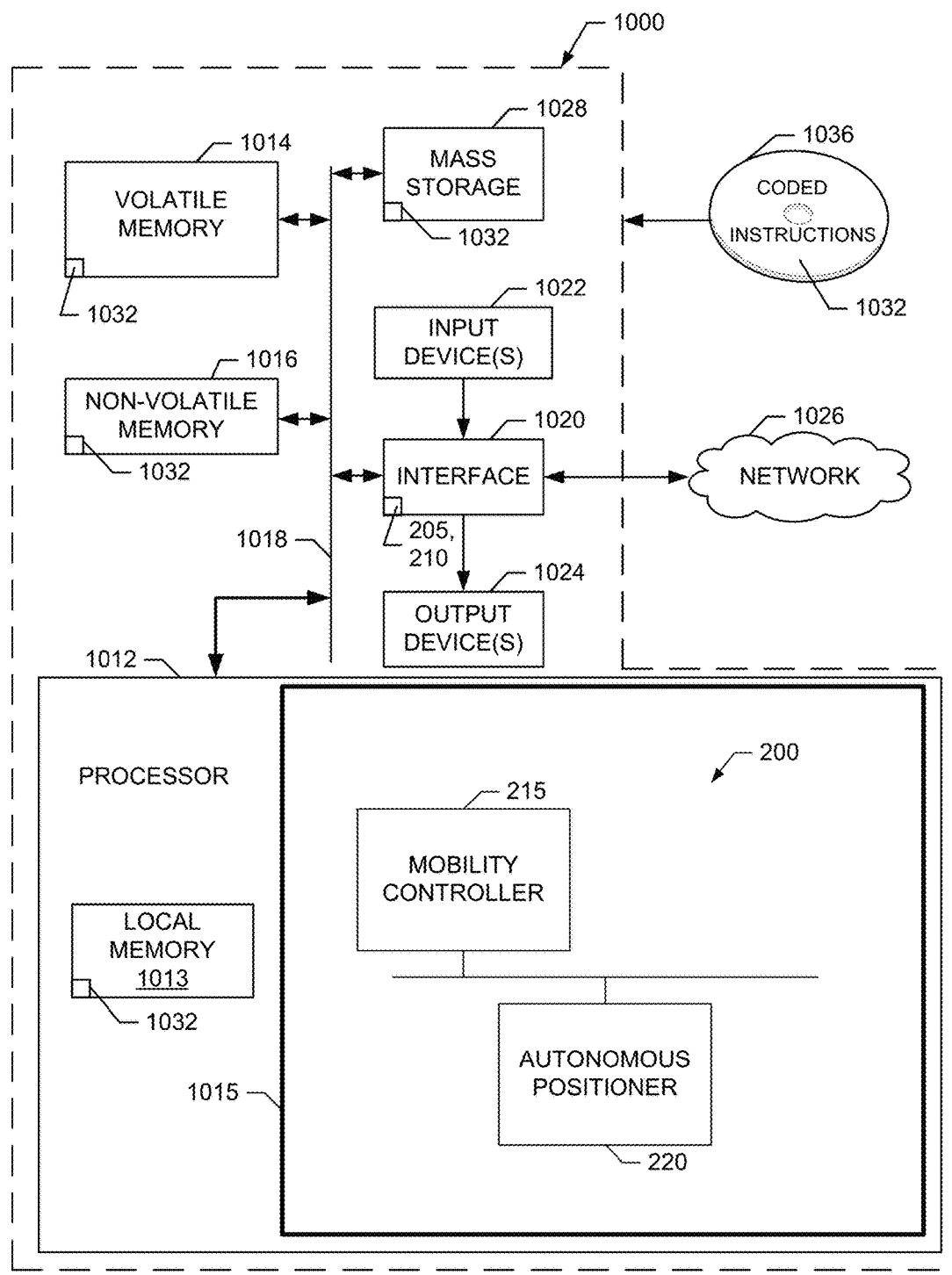
FIG. 10 is a block diagram of an example processor platform structured to execute the example machine readable instructions of FIGS. 4, 5 and/or 6 to implement the example drone processing unit of FIG. 2.

FIG. 10 is a block diagram of an example processor platform 1000 capable of executing the instructions of FIGS. 4, 5 and/or 6 to implement the example drone processing unit 200 of FIG. 2. The processor platform 1000 can be, for example, any type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example of FIG. 10, the processor 1012 includes one or more example processing cores 1015 configured via example instructions 1032, which include the example instructions of FIGS. 4, 5 and/or 6, to implement the example drone processing unit 200, the example mobility controller 215 and/or the example autonomous positioner 220 of FIG. 2.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a voice recognition system, a keypad, etc. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display and/or speakers. The interface circuit 1020 of the illustrated example, thus, may include a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026. In the illustrated example of FIG. 10, the interface circuit 1020 is also structured to implement the example transceiver 205 and/or the example portable base station 210 of FIG. 2.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID (redundant array of independent disks) systems, digital versatile disk (DVD) drives, solid state memories, etc.

Coded instructions 1032 corresponding to the instructions of FIGS. 4, 5 and/or 6 may be stored in the mass storage device 1028, in the volatile memory 1014, in the non-volatile memory 1016, in the local memory 1013 and/or on a removable tangible computer readable storage medium, such as a CD or DVD 1036.

Figure 11:
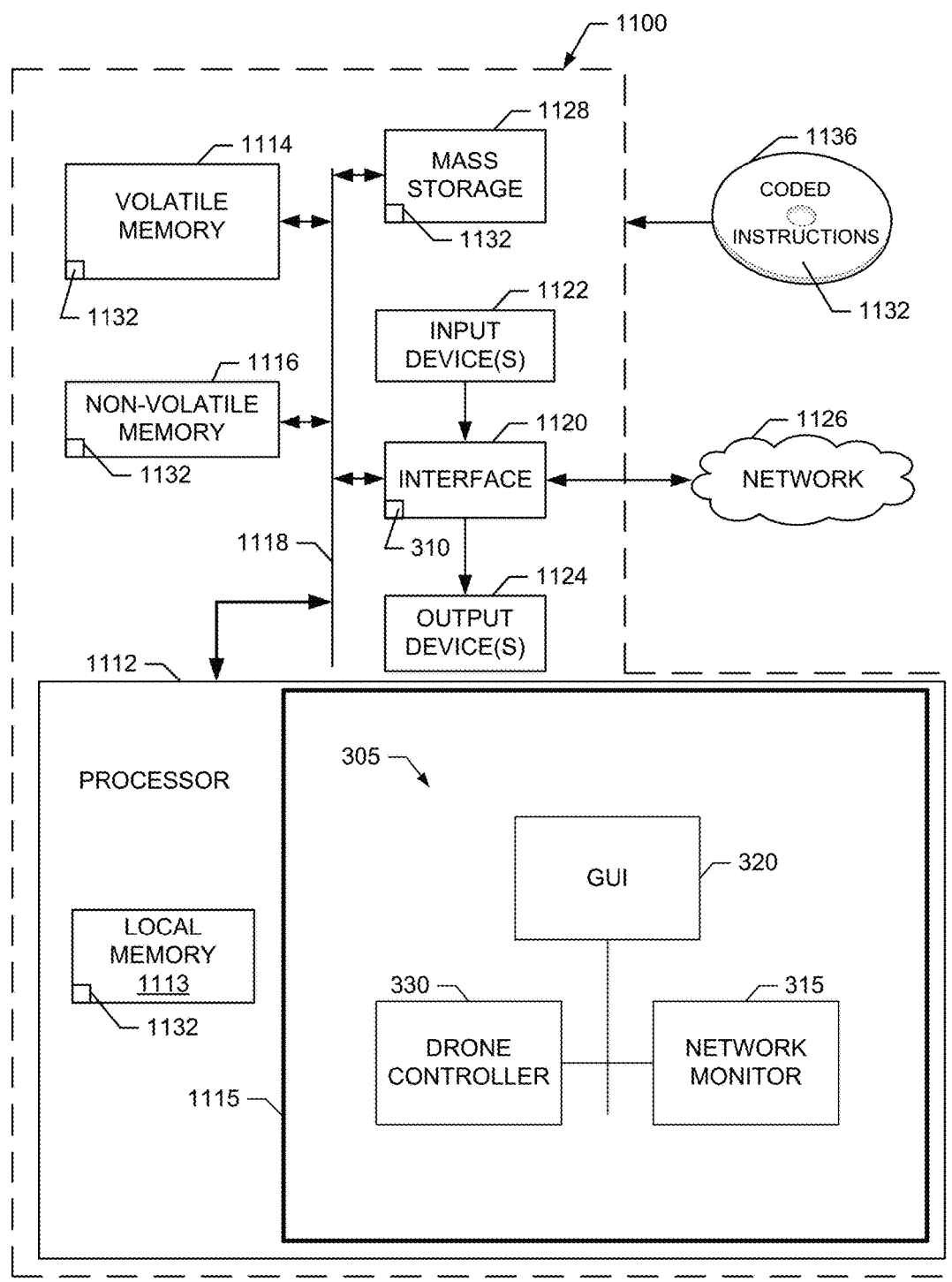
FIG. 11 is a block diagram of an example processor platform structured to execute the example machine readable instructions of FIGS. 7, 8 and/or 9 to implement the example command center of FIGS. 1A-C and/or 3.

FIG. 11 is a block diagram of an example processor platform 1100 capable of executing the instructions of FIGS. 7, 8 and/or 9 to implement the example command center 110 of FIGS. 1A-C and/or 3. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example of FIG. 11, the processor 1112 includes one or more example processing cores 1115 configured via example instructions 1132, which include the example instructions of FIGS. 7, 8 and/or 9, to implement the example drone manager 305, the example network monitor 315, the example GUI 320, the example computing device 325 and/or the example drone controller 330 of FIG. 3.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by SDRAM, DRAM, RDRAM and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a USB, and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1124 are also connected to the interface circuit 1120 of the illustrated example. The output devices 1124 can be implemented, for example, by display devices (e.g., an LED, an OLED, a liquid crystal display, a CRT, a touchscreen, a tactile output device, a printer and/or speakers). The interface circuit 1120 of the illustrated example, thus, may include a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a DSL, a telephone line, coaxial cable, a cellular telephone system, etc.). In the illustrated example of FIG. 11, the interface circuit 1120 is also structured to implement the example network interface 310 of FIG. 3.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, DVD drives, solid state memories, etc.

Coded instructions 1132 corresponding to the instructions of FIGS. 7, 8 and/or 9 may be stored in the mass storage device 1128, in the volatile memory 1114, in the non-volatile memory 1116, in the local memory 1113 and/or on a removable tangible computer readable storage medium, such as a CD or DVD 1136.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method, comprising:
   deploying a plurality of drones to a plurality of different locations within a geographic area, each drone of the plurality of drones being deployed to a respective one of the plurality of different locations, wherein the plurality of drones provides wireless network coverage to a plurality of different coverage zones, each drone of the plurality of drones providing coverage to a respective one of the plurality of different coverage zones; and
   repositioning one or more of the plurality of drones thus deployed to reduce a coverage overlap between two or more of the plurality of different coverage zones or to reduce one or more coverage holes within the geographic area, wherein the one or more coverage holes correspond to one or more portions of the geographic area not covered by any of the plurality of different coverage zones.

2. The method of claim 1, further comprising: receiving positioning information and monitored signal strength measurements from the plurality of drones, wherein the repositioning is based on the receiving.

3. The method of claim 1, wherein the deploying comprises: prior to the deploying, determining the geographic area is not currently experiencing a network coverage problem but is expected to experience the network coverage problem at a later time.

4. The method of claim 1, further comprising: before the repositioning, determining that the coverage overlap exists by:
   measuring, with a wireless communications device on a first drone of the plurality of drones, a strength of a signal received from a second drone of the plurality of drones; and
   determining the strength of the signal exceeds a predefined threshold value.

5. The method of claim 4, wherein the repositioning comprises moving the first drone away from the second drone by a first distance based on a function of the strength of the signal.

6. The method of claim 5, wherein the moving comprises adjusting a value of the first distance a plurality of times during the moving.

7. The method of claim 1, wherein each drone of the plurality of drones carries a portable base station, and wherein the deploying or the repositioning is performed based on a command received from a command center that is remotely located from the plurality of drones.

8. A non-transitory computer readable medium including computer readable instructions which, when executed, cause performance of operations, the operations comprising:
   determining that a geographic area needs or will need wireless network coverage;
   in response to the determining, deploying a plurality of drones to a plurality of different locations within the geographic area, each drone of the plurality of drones being deployed to a respective one of the plurality of different locations, wherein the plurality of drones provides the wireless network coverage to a plurality of different coverage zones, each drone of the plurality of drones providing coverage to a respective one of the plurality of different coverage zones;
   determining, after the deploying, that:
      a coverage overlap exists between two or more of the plurality of different coverage zones; or
      one or more coverage holes exist within the geographic area, wherein the one or more coverage holes correspond to one or more portions of the geographic area not covered by any of the plurality of different coverage zones; and
   adjusting, in response to the determining after the deploying, one or more locations of one or more of the plurality of drones to shrink the coverage overlap or the one or more coverage holes.

9. The non-transitory computer readable medium of claim 8, wherein the operations further comprise: receiving positioning information and monitored signal strength measurements from the plurality of drones, wherein the determining after the deploying is based on the receiving.

10. The non-transitory computer readable medium of claim 8, wherein the plurality of drones includes a first drone and a second drone, and wherein the operations further comprise: measuring a strength of a signal communicated between the first drone and the second drone.

11. The non-transitory computer readable medium of claim 10, wherein the determining that the coverage overlap exists comprises determining that the strength of the signal is greater than a predefined value.

12. The non-transitory computer readable medium of claim 10, wherein the adjusting comprises moving the first drone and the second drone away from each other by a distance, wherein a value of the distance is correlated with the strength of the signal, and wherein the moving comprises adjusting the value of the distance a plurality of times during the moving.

13. The non-transitory computer readable medium of claim 8, wherein:
   the plurality of drones each carries a portable base station for implementing a cell of a mobile cellular network; and
   the deploying or the adjusting is performed by the plurality of drones or by a command center that is remotely located from the plurality of drones.

14. A system, comprising:
   a plurality of drones that are each configured to provide wireless network coverage for a respective coverage zone; and
   a command center that is configured to perform operations that include:
      generating target locations for deploying the plurality of drones so that the plurality of drones will provide the wireless network coverage for mobile devices in a geographic area;
      determining, after the plurality of drones has reached their respective target locations, that:
         a coverage overlap exists between the coverage zones provided by at least some of the plurality of drones; and
         one or more coverage holes exist within the geographic area; and
      causing one or more of the plurality of drones to adjust their respective locations so as to decrease the coverage overlap and the one or more coverage holes.

15. The system of claim 14, wherein the operations further comprise: receiving positioning information and monitored signal strength measurements from the plurality of drones, wherein the determining is based on the receiving.

16. The system of claim 14, wherein the operations further comprise: before the generating of the target locations, determining that the geographic area is not currently experiencing a network coverage problem but is expected to experience the network coverage problem at a later time.

17. The system of claim 14, wherein the determining that the coverage overlap exists comprises:
   measuring, with a wireless communications device on a first drone of the plurality of drones, a strength of a signal received from a second drone of the plurality of drones; and
   determining that the coverage overlap exists in response to the strength of the signal exceeding a predefined threshold value.

18. The system of claim 17, wherein the causing comprises sending instructions to the first drone to move the first drone away from the second drone by a distance, wherein a value of the distance is dynamically reconfigured a plurality of times as a function of the strength of the signal as the first drone is moved away from the second drone.

19. The system of claim 14, wherein the plurality of drones each carries a portable base station for implementing a cell of a mobile cellular network.

20. The system of claim 14, wherein the plurality of drones each includes an unmanned aerial vehicle.

* * * * *